(12) United States Patent
Sparling

(10) Patent No.: US 9,108,659 B2
(45) Date of Patent: Aug. 18, 2015

(54) STROLLER WITH SELECTIVELY HIDDEN ADAPTERS

(71) Applicant: Chad Allen Sparling, Ortonville, MI (US)

(72) Inventor: Chad Allen Sparling, Ortonville, MI (US)

(73) Assignee: RECARO CHILD SAFETY LLC, Auburn Hills, MI (US)

( * ) Notice: Subject to any disclaimer, the term of this patent is extended or adjusted under 35 U.S.C. 154(b) by 0 days.

(21) Appl. No.: 14/195,080

(22) Filed: Mar. 3, 2014

(65) Prior Publication Data

US 2015/0042056 A1    Feb. 12, 2015

Related U.S. Application Data

(60) Provisional application No. 61/863,103, filed on Aug. 7, 2013.

(51) Int. Cl.
*B62B 7/14* (2006.01)
*B62B 9/12* (2006.01)

(52) U.S. Cl.
CPC ........................................ *B62B 9/12* (2013.01)

(58) Field of Classification Search
CPC ........ B62B 7/142; B62B 7/145; B62B 7/006; B62B 7/062; B62B 7/14; B62B 9/12; B62B 9/245
USPC ................. 280/642, 643, 647, 648, 650, 658, 280/47.38
See application file for complete search history.

(56) References Cited

U.S. PATENT DOCUMENTS

| 5,794,951 | A | 8/1998 | Corley et al. |
|---|---|---|---|
| 6,698,773 | B2 | 3/2004 | Hsia |
| 7,032,922 | B1 | 4/2006 | Lan |
| 7,320,471 | B2 | 1/2008 | Maciejczyk |
| 8,029,014 | B2 | 10/2011 | Ahnert et al. |
| 8,087,680 | B2 | 1/2012 | Dotsey et al. |
| 8,251,382 | B2 | 8/2012 | Chen et al. |
| 8,322,744 | B2 | 12/2012 | Ahnert et al. |
| 8,398,098 | B2 | 3/2013 | Li |
| 2010/0230933 | A1 | 9/2010 | Dean et al. |
| 2010/0244408 | A1* | 9/2010 | Dean et al. ..................... 280/647 |
| 2010/0259021 | A1 | 10/2010 | Ahnert et al. |
| 2011/0241313 | A1 | 10/2011 | Homan et al. |
| 2011/0241395 | A1* | 10/2011 | Homan et al. ............. 297/250.1 |
| 2013/0075992 | A1 | 3/2013 | Zhu |
| 2013/0154239 | A1 | 6/2013 | Longenecker et al. |
| 2013/0257002 | A1* | 10/2013 | Horst et al. ................ 280/47.38 |

* cited by examiner

*Primary Examiner* — Hau Phan
*Assistant Examiner* — Bryan Evans
(74) *Attorney, Agent, or Firm* — Thompson Hine LLP

(57) ABSTRACT

A stroller may include a frame and at least two adapters. An infant seat may be selectively engaged with the stroller. The frame may have a first side and a second side that generally oppose one another. The adapters may each be configured to selectively engage with the infant seat. One of the adapters may be positioned on the first side of the frame, and a remaining adapter may be positioned on the second side of the frame. The adapters may be rotatable between a first position and a second position. The adapters may be visible and positioned to engage with the infant seat in the first position, and may be substantially hidden from view in the second position.

12 Claims, 20 Drawing Sheets

STROLLER WITH SELECTIVELY HIDDEN ADAPTERS

TECHNICAL FIELD

The disclosure relates generally to a stroller having adapters and, more particularly, to a stroller having adapters that may be rotatable between a first position and a second position. The adapters may be substantially hidden from view when in the second position.

BACKGROUND

Some types of strollers may include a dedicated child seat as well as adapters for securing an infant carrier or seat to a frame of the stroller. The dedicated child seat may be configured to receive a relatively larger child, such as a toddler, and may typically not be intended to seat a relatively smaller child, such as an infant or a newborn. Instead, the adapters may be used to selectively attach the infant seat to the frame of the stroller. The infant seat may be used to accommodate a smaller child in the stroller until the child grows into a size large enough to be seated within the dedicated child seat. Thus, the stroller may be used to transport children of various sizes.

Other types of strollers may include various attachment mechanisms that allow for different types of seating mechanisms to be secured to the stroller. For example, these types of strollers may also include adapters that secure an infant seat to a frame of the stroller. In addition to the adapters, these types of strollers may also include attachment points that secure a pram or carry cot to the frame of the stroller as well.

The adapters for either type of stroller typically project upwardly from the sides of the stroller, and may each be positioned to selectively engage with retaining mechanisms located on the infant seat. Once the infant seat is no longer secured to the frame of the stroller, the adapters may be visible. Some individuals may not find the upwardly projecting adapters to be aesthetically pleasing, especially if the adapters are relatively large or bulky in size. Thus, the stroller may have detachable adapters, where each adapter may be separately removed from the frame of the stroller when the infant seat is not attached to the frame. However, it may be difficult to keep track of multiple adapters, and sometimes the adapters may even be misplaced or lost.

SUMMARY

In one embodiment, a stroller may include a frame and at least two adapters. An infant seat may be selectively engaged with the stroller. The frame may have a first side and a second side that generally oppose one another. The adapters may each be configured to selectively engage with the infant seat. One of the adapters may be positioned on the first side of the frame, and a remaining adapter may be positioned on the second side of the frame. The adapters may be rotatable between a first position and a second position. The adapters may be visible and positioned to engage with the infant seat in the first position, and may be substantially hidden from view in the second position.

In another embodiment, a stroller may include a frame and at least two adapters. An infant seat may be selectively engaged with the stroller. The frame may have a first side, a second side, a first hub, and a second hub. The first side and the second side of the frame generally oppose one another, and the first hub and the second hub are located on the first side and the second side of the stroller respectively. The adapters may each be configured to selectively engage with the infant seat. One of the adapters may be positioned on the first side of the frame and is rotatable about the first hub between a first position and a second position. A remaining adapter is positioned on the second side of the frame and is rotatable about the second hub between the first position and the second position. The adapters are visible and positioned to engage with the infant seat in the first position, and are substantially hidden from view in the second position.

Other objects and advantages of the disclosed system will be apparent from the following description, the accompanying drawings and the appended claims.

DETAILED DESCRIPTION

Figure 1:
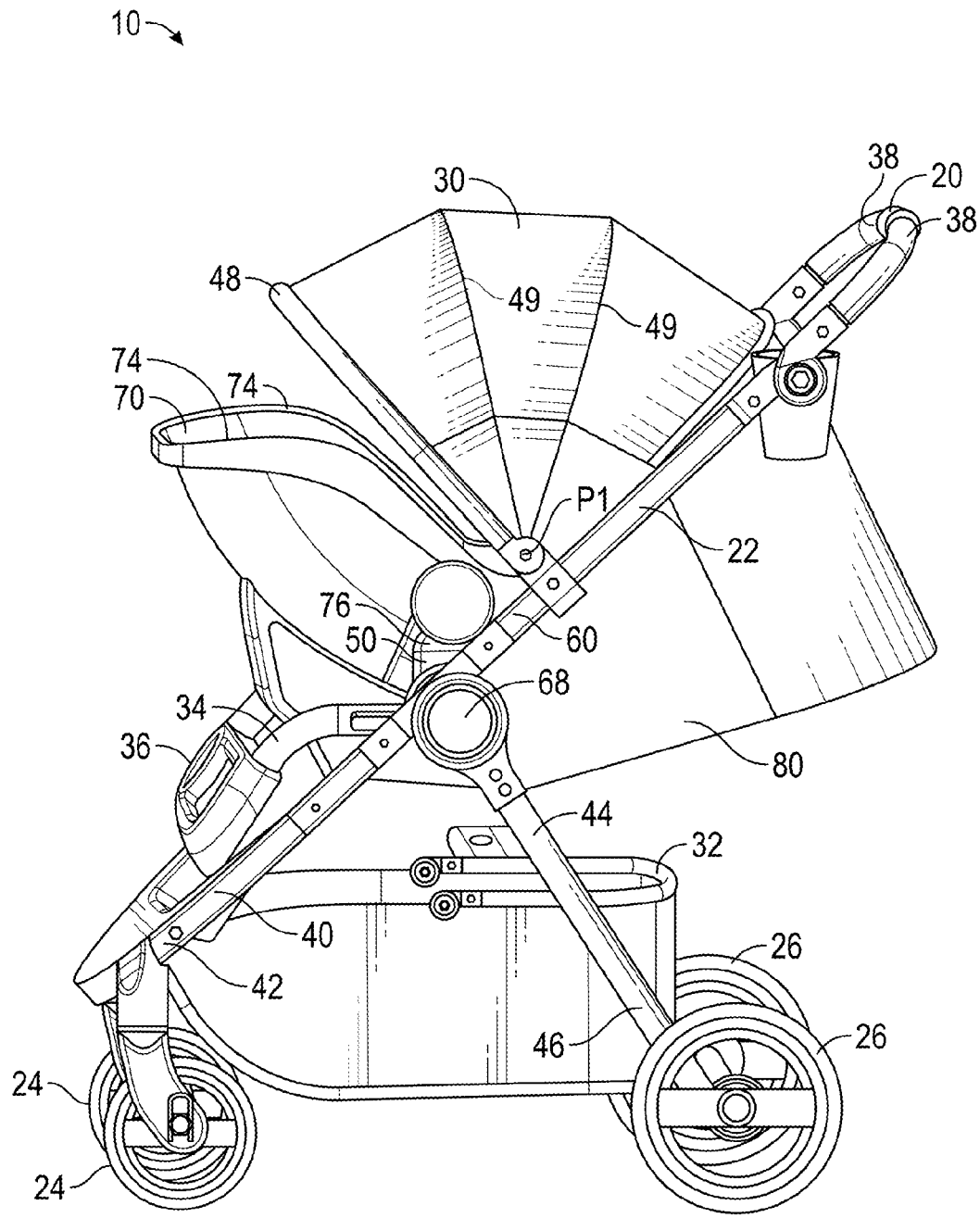
FIG. 1 is a side view of the disclosed stroller assembly, where an infant seat is engaged with a frame of a stroller.
Figure 2:
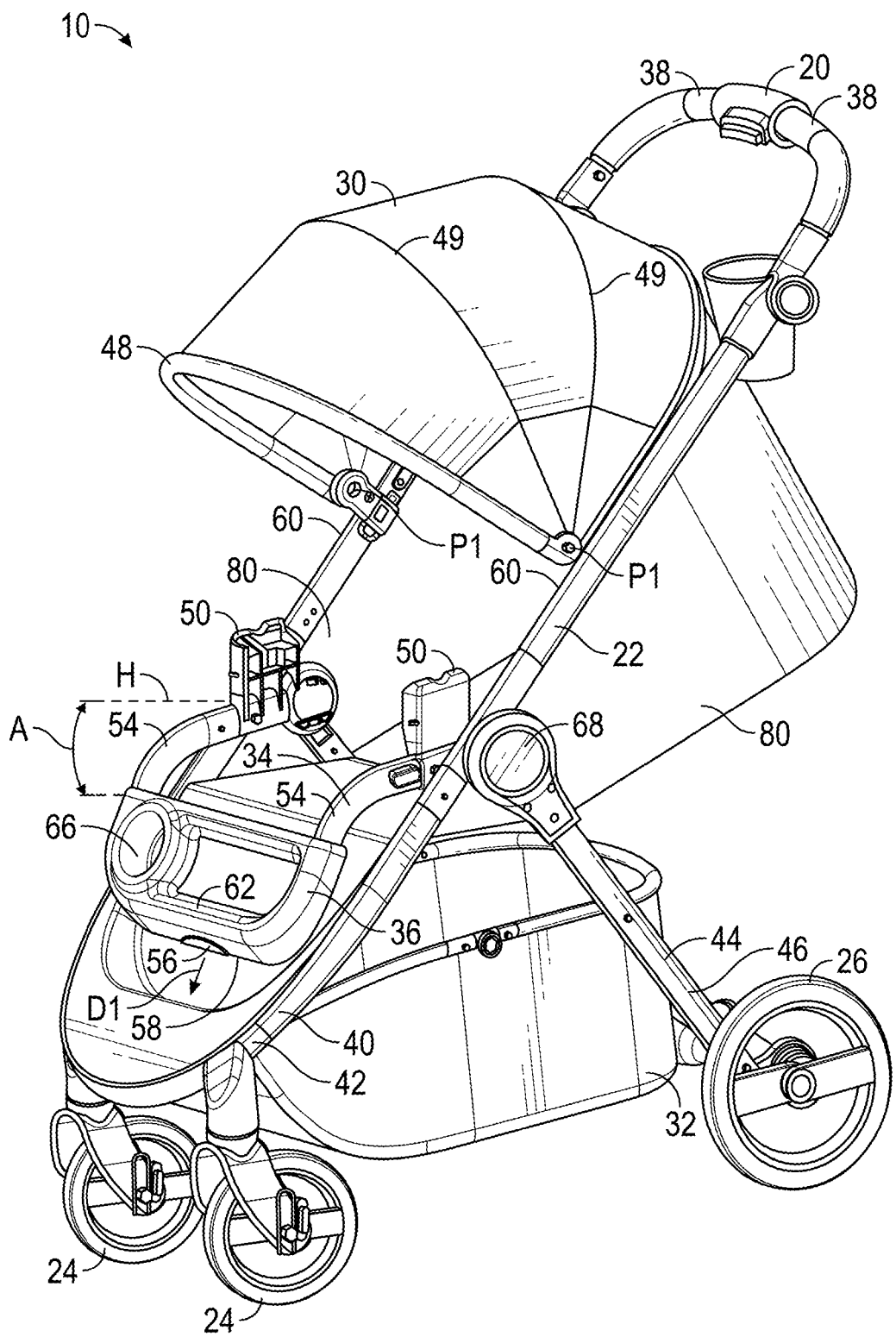
FIG. 2 is a perspective of the stroller of FIG. 1, where a moveable arm of the stroller is in a first position.
Figure 3:
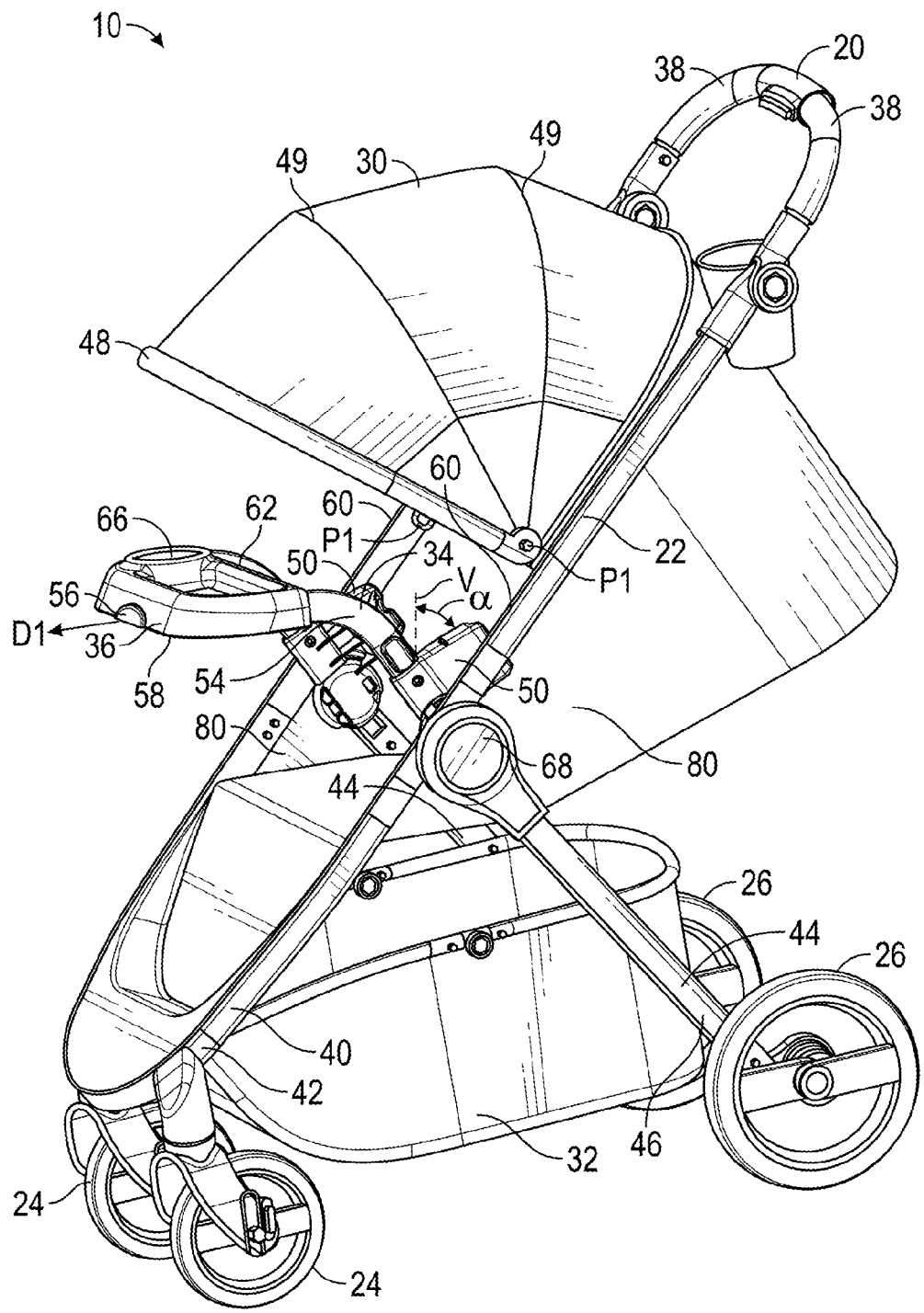
FIG. 3 is a perspective of the stroller of FIG. 1, where the moveable arm of the stroller is in a second position.

As shown in FIGS. 1-3, the disclosed stroller, generally designated 10, may include a handle 20, a frame 22, a set of front wheels 24, a set of rear wheels 26, a canopy 30, a basket 32, a moveable arm 34, and a tray 36. The handle 20 of the stroller 10 may include two gripping portions 38. The frame 22 of the stroller 10 may include a single front member 40 (best seen in FIGS. 2-3) and two rear members 44. The front wheels 24 of the stroller 10 may be connected to a generally rounded, bottom portion 42 of the single front member 40 of the frame 22. Each of the rear wheels 26 of the stroller 10 may be connected to a bottom portion 46 of one of the rear members 44 of the stroller 10. Although FIGS. 1-3 illustrate the frame 22 of the stroller 10 having a single front member 40 that connects to both the front wheels 24, it is to be understood that the frame 22 of the stroller 10 may also include two discrete front members as well, where each front member connects to one of the front wheels 24. In one embodiment, the frame 22 of the stroller 10 may be foldable between a collapsed position (not illustrated) and a deployed position as shown in FIGS. 1-3.

The stroller 10 may also include a child seat (not illustrated). The child seat may be located between two side portions 80 of the canopy 30 of the stroller 10. The child seat may be sized to receive a relatively larger child, such as a toddler, and may typically not be intended to transport a relatively smaller child, such as an infant. Instead, an infant seat 70 (shown in FIG. 1) may be selectively engaged with the frame 22 of the stroller 10 in order to accommodate a smaller child. Thus, the stroller 10 may be used to transport children of various sizes. Moreover, the stroller 10 may accommodate children as they grow from an infant into a toddler.

The canopy 30 of the stroller 10 may include a support rod or frame 48 and a plurality of bows 49. In the non-limiting embodiment as shown in FIGS. 1-3, the frame 48 and each of the bows 49 of the canopy 30 may be generally U-shaped. The frame 48 and the bows 49 of the canopy 30 may be attached to the frame 22 of the stroller 10 at pivots P1. The pivots P1 may each positioned on opposing sides 60 of the stroller 10 (both of the pivots P1 are visible in FIG. 2). The frame 48 and each of the bows 49 may be rotatable about the two pivots P1 to actuate the canopy 30 between a folded position (not illustrated) and an installed position (shown in FIGS. 1-3). When in the installed position, the canopy 30 may be used to shield an occupant of the stroller 10 from outside elements such as, for example, sunlight, rain, or snow.

Referring to FIGS. 2-3, the moveable arm 34 may be selectively engaged to the frame 22 of the stroller 10. That is, although FIGS. 1-3 illustrate the moveable arm 34 attached to the frame 22 of the stroller 10, a user may remove the moveable arm 34 from the stroller 10 if desired. The moveable arm 34 may include the tray 36, two adapters 50, and two generally tubular or hollow members 54. One of the adapters 50 of the moveable arm 34 may be positioned on one side 60 of the stroller 10, and the remaining adapter 50 may be positioned on the other side 60 of the stroller. The adapters 50 may be used to selectively engage with and secure the infant seat 70 (illustrated in FIG. 1) to the frame 22 of the stroller 10. The members 54 of the moveable arm 34 each correspond to one of the adapters 50. The tray 36 may be connected to the adapters 50 by the members 54 of the moveable arm 34. The tray 36 of the moveable arm 34 may include a lip 62 and a cup holder 66. The lip 62 may define a perimeter around the tray 36. Various objects, such as a child's toys or food, may be placed within the perimeter of the tray 36.

Two hubs 68 may be positioned on corresponding sides 60 of the frame 22 of the stroller 10 (only one of the hubs 68 on one side 60 of the stroller 10 is visible in FIGS. 1-3). The moveable arm 34 may be rotated about the hubs 68 on the frame 22 of the stroller 10. Specifically, the moveable arm 34 may be rotatable about the hubs 68 between a first position (seen in FIGS. 1-2) and a second position (seen in FIG. 3). A user may pull a handle 56 located along a bottom surface 58 of the tray 36 in a direction D1 in order to rotate the moveable arm 34 between the first position and the second position. Rotation of the moveable arm 34 about the two hubs 68 on the frame 22 of the stroller 10 is described in greater detail below.

Referring to FIG. 1, the infant seat 70 (FIG. 1) may be selectively engaged with and secured to the frame 22 of the stroller 10 by the adapters 50 of the moveable arm 34. The infant seat 70 may include opposing sides 74, where a receiving member 76 may be located on each side 74 of the infant seat 70 (only one of the receiving members 76 is visible in FIG. 1). Each receiving member 76 of the infant seat 70 may include a corresponding releasable attachment device 78 (shown in FIGS. 4-5). Each releasable attachment device 78 may be located within the corresponding receiving member 76 of the infant seat 70, and may be configured to selectively engage with one of the adapters 50. The engagement between the releasable attachment devices 78 and the adapters 50 may secure the infant seat 70 to the stroller 10.

Figure 4:
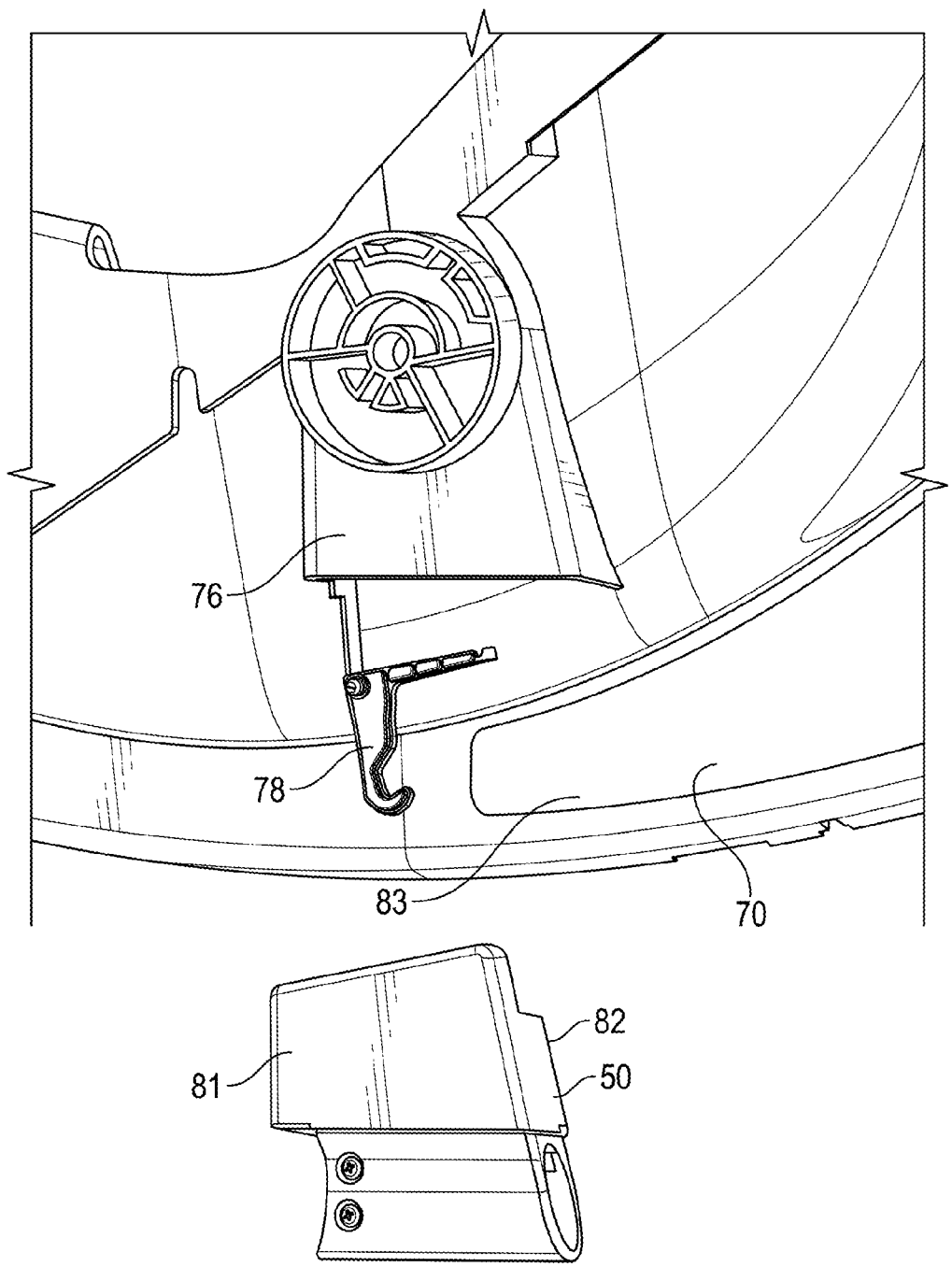
FIG. 4 is a perspective of a receiving member located on the infant seat, a corresponding attachment device located within the receiving member (shown exploded from the receiving member), and a corresponding adapter of the stroller shown in FIG. 1.
Figure 5:
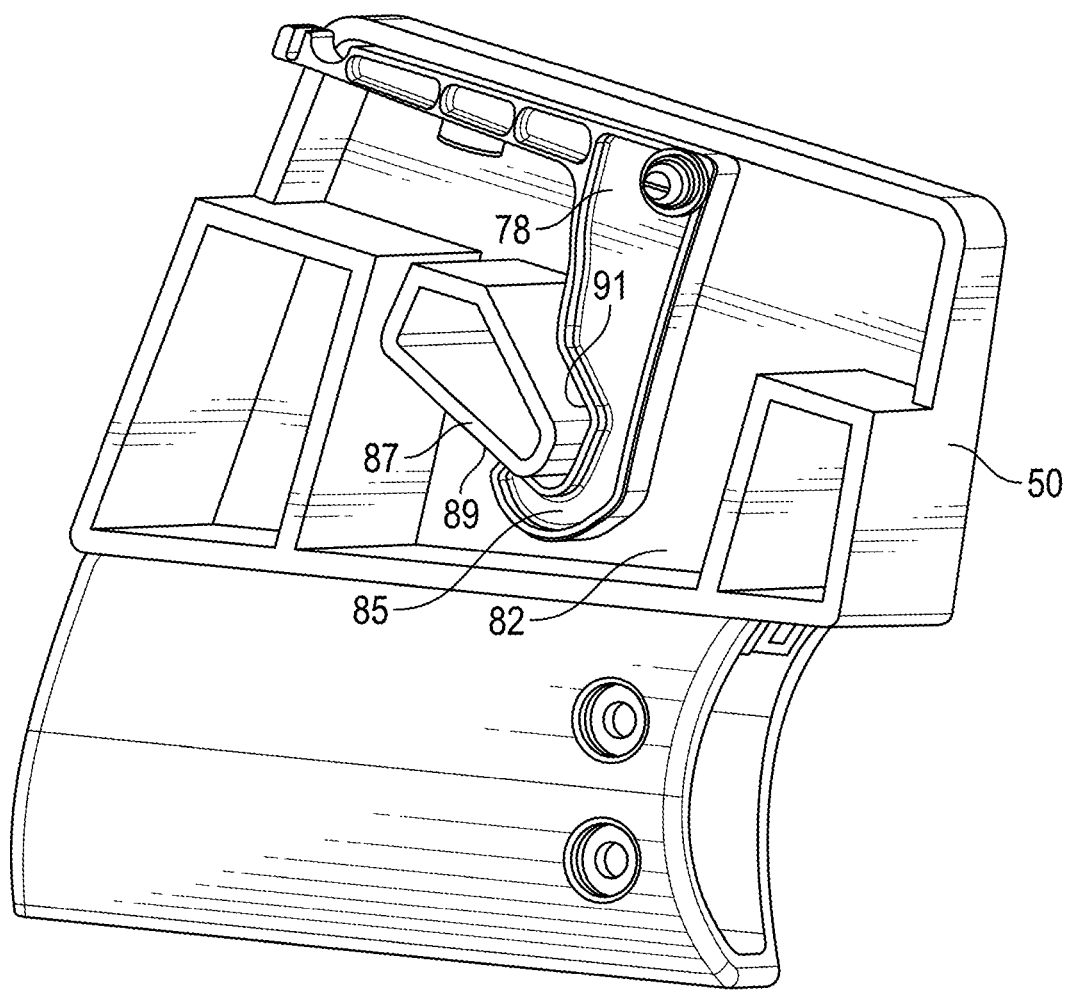
FIG. 5 is a cross-section of a rear side of the adapter and the corresponding attachment device shown in FIG. 4.

FIG. 4 illustrates one of the receiving members 76 of the infant seat 70, a corresponding releasable attachment device 78 located within the receiving member 76 (shown exploded from the receiving member 76), and a corresponding adapter 50. The adapter 50 may include a front side 81 and a rear side 82. The rear side 82 of the adapter 50 may oppose an outer surface 83 of the infant seat 70. FIG. 5 is a cross-section taken along the rear side 82 of one of the adapters 50. FIG. 5 also includes the corresponding releasable attachment device 78 seen in FIG. 4. It should be noted that the receiving member 76 and the infant seat 70 are omitted in FIG. 5 for ease of illustration and clarity. In the exemplary embodiment as shown, the releasable attachment device 78 of the infant seat 70 includes a hook-shaped member 85. The hook-shaped member 85 of the attachment device 78 may be sized to receive and engage with a mating feature 87 located along the rear side 82 of the adapter 50. The mating feature 87 may be a projection that extends outwardly from the rear side 82 of the adapter 50. The mating feature 87 of the adapter 50 may include an outer periphery 89 that generally corresponds with an inner surface 91 of the hook-shaped member 85. It should be noted that FIGS. 4-5 are merely illustrating one embodiment of the adapter 50 and the releasable attachment device 78, and it is understood that other approaches may be used as well to secure the infant seat 70 to the stroller 10.

Turning back to FIG. 2, the moveable arm 34 of the stroller 10 is shown in the first position. When in the first position, the tray 36 of the moveable arm 34 may be positioned downwardly at an angle A. The angle A may be measured from horizontal line H. Moreover, when the moveable arm 34 of the stroller 10 is in the first position, the adapters 50 may project upwardly and be easily viewed by a user. Moreover, the adapters 50 may be positioned to engage with the infant seat 70 (shown in FIG. 1). If an individual removes the infant seat 70 from the frame 22 of the stroller 10, the moveable arm 34 of the stroller 10 may be rotated in an upwards direction from the first position and into the second position (illustrated in FIG. 3).

Referring to FIG. 3, when the moveable arm 34 of the stroller 10 is in the second position, the adapters 50 may be positioned at an angle $\alpha$ with respect to vertical line V. The side portions 80 of the canopy 30 may generally obstruct or hide at least a portion of the adapters 50 from view. Specifically, when an individual views the stroller 10 along one of the sides 60, at least a portion of the adapters 50 may be substantially hidden by the side portions 80 of the canopy 30. Hiding the adapters 50 may be beneficial, as some individuals may not find the upwardly projecting adapters 50 as seen in FIG. 2 to be aesthetically pleasing.

When the moveable arm 34 is in the second position, the infant seat 70 may not be secured to the frame 22 of the stroller 10. Instead, the stroller 10 may be used to transport a relatively larger child in the child seat located between two side portions 80 of the canopy 30 of the stroller 10 (the child seat is not illustrated). When the moveable arm 34 is in the second position, the tray 36 may be positioned generally parallel to horizontal. Thus, a larger child placed within the child seat (not illustrated) may be able to access objects placed on the tray 36 or a drink placed in the cup holder 66 of the moveable arm 34.

Figure 6:
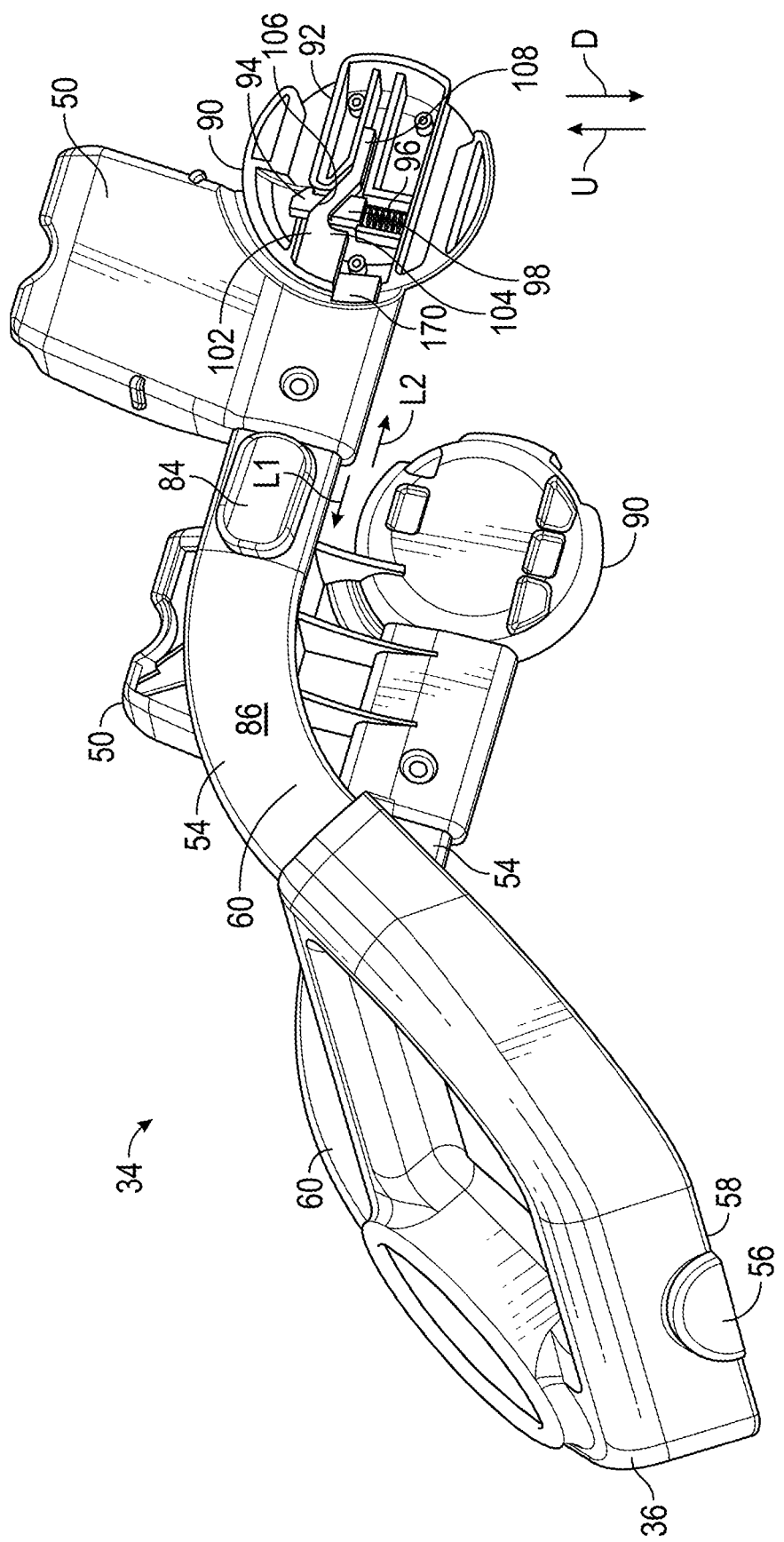
FIG. 6 is a perspective of the moveable arm shown in FIG. 1, where the moveable arm is detached from the frame of the stroller, and a tube located on one side of the moveable arm has been omitted.

FIG. 6 is an illustration of the moveable arm 34, which has been removed from the frame 22 of the stroller 10. Two slidable buttons 84 (only one of the buttons is visible in FIG. 6) may be located along an outer surface 86 of each of the members 54 of the moveable arm 34. The buttons 84 may each be slid in a first linear direction L1 by a user in order to remove the moveable arm 34 from the frame 22 of the stroller 10 (FIGS. 1-3). However, the buttons 84 may be normally biased in a second linear direction L2 that generally opposes the first linear direction L1. A slidable arm 104 and a biasing member 116 (visible in FIG. 7) may be located within each of the members 54 of the moveable arm 34 to normally bias the buttons 84. The slidable arm 104 and the biasing member 116 are described in greater detail below.

The moveable arm 34 may include two hubs 90 that may be selectively engaged with the hubs 68 located on opposing sides 60 of the frame 22 of the stroller 10 (shown in FIGS. 2-3). The hubs 90 of the moveable arm 34 may each include a tongue 92, a finger 94, and a biasing member 96 (the tongue 92, the finger 94, and the biasing member 96 are only visible on one of the hubs 90 in FIG. 6). FIG. 6 illustrates the finger 94 of the hub 90 in a normally biased position, where the biasing member 96 may be positioned against and exert a biasing force against a bottom portion 98 of the finger 94. The biasing force exerted by the biasing member 96 urges the finger 94 in a generally upwards direction U, which in turn retains the finger 94 in the normally biased position. It should be noted that while FIG. 6 illustrates the biasing member 96 as a coil spring, it is to be understood that any other biasing mechanism capable of exerting the biasing force against the finger 94 may be used as well.

A slidable arm 104 (only a portion of one of the slidable arms 104 is visible in FIG. 6) may be located on each side 60 of the moveable arm 34. An engagement arm 170 (one of the engagement arms 170 is fully visible in FIG. 7) may also be located on each side 60 of the moveable arm 34 as well. Both members 54 of the moveable arm 34 may be generally tubular or hollow. Thus, a portion of one of the slidable arms 104 and a portion of one of the engagement arms 170 may be located within a corresponding one of the members 54 of the moveable arm 34. The slidable arms 104 may be used to selectively engage the moveable arm 34 with the frame 22 of the stroller 10 (FIGS. 1-3), and is described in greater detail below. The engagement arms 170 may be used to secure the moveable arm 34 in either the first position (shown in FIG. 2) or the second position (shown in FIG. 3), and is also described in greater detail below.

A portion of each slidable arm 104 may be located within a corresponding one of the members 54 of the moveable arm 34 (the portion of the slidable arm 104 located within the member 54 is not visible in FIG. 6), and a remaining portion 102 of each slidable arm 104 may be located within the hub 90 of the moveable arm 34. The portion 102 of each slidable arm 104 located within the hub 90 of the moveable arm 90 includes an angled section 108. The angled section 108 of each moveable arm 34 may be sloped or oriented in a generally downwards direction. Each finger 94 located within one of the hubs 90 of the moveable arm 34 may define a recess 106. The angled section 108 of each moveable arm 34 may be received by the recess 106 of a corresponding finger 94.

Figure 7:
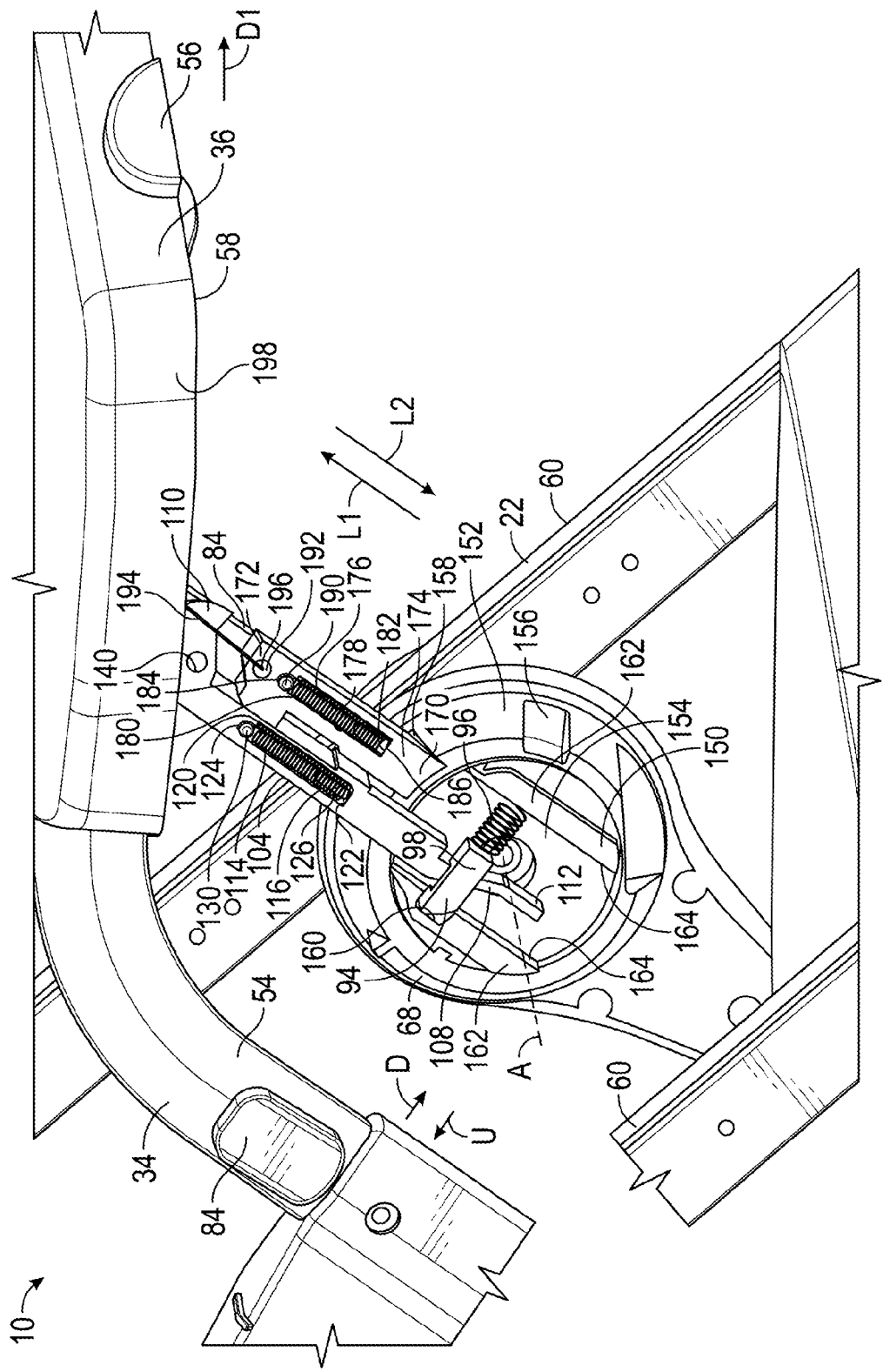
FIG. 7 is a detail of the moveable arm shown in FIG. 6.

FIG. 7 is an illustration of a portion of the stroller 10, where one of the members 54, one of the adapters 50, and one of the hubs 90 located on one side 60 of the moveable arm 34 are omitted. Thus, the slidable arm 104, the engagement arm 170, the finger 94 and the biasing member 96 may be visible in FIG. 7. The remaining slidable arm 104, engagement arm 170, finger 94 and biasing member 96 located on the opposing side 60 of the moveable arm 34 are hidden from view. It should be noted that while the components located on only one side 60 of the stroller 10 are shown in FIG. 7, the opposing side 60 of the stroller 10 may be a mirror image.

The slidable arm 104 may include a first end 110, a second end 112, and a slot 114, where the biasing member 116 may be located within the slot 114. The slot 114 of the slidable arm 104 may include a first end 120 and a second end 122. Similarly, the biasing member 116 of the slidable arm 104 may also include a first end 124 and a second end 126. The first end 124 of the biasing member 116 may be engaged with a post 130 located at the first end 130 of the slot 114. The post 130 may be fixedly attached to a corresponding member 54 of the moveable arm 34 (the member 54 is not visible in FIG. 7). The second end 126 of the biasing member 116 may exert a biasing force against the second end 122 of the slot 114 of the slidable arm 104 in the second linear direction L2. The biasing force exerted by the biasing member 116 against the slot 114 of the slidable arm 104 may be used to keep the slidable arm 104 normally biased in the second linear direction L2.

The first end 110 of the slidable arm 104 may also include an aperture 140 for receiving a fastener (not shown). The fastener may be any device configured to fixedly attach the first end 110 of the slidable arm 104 to a corresponding one of the buttons 84 located on the moveable arm 34. In other words, the button 84 of the moveable arm 34 may be fixedly attached to the first end 110 of the slidable arm 104 by a fastener such as, for example, a pin. Thus, the biasing force exerted by the biasing member 116 not only keeps the slidable arm 104 normally biased in the second linear direction L2, but also keeps the corresponding button 84 of the moveable arm 84 normally biased in the second linear direction L2 as well.

Figure 8:
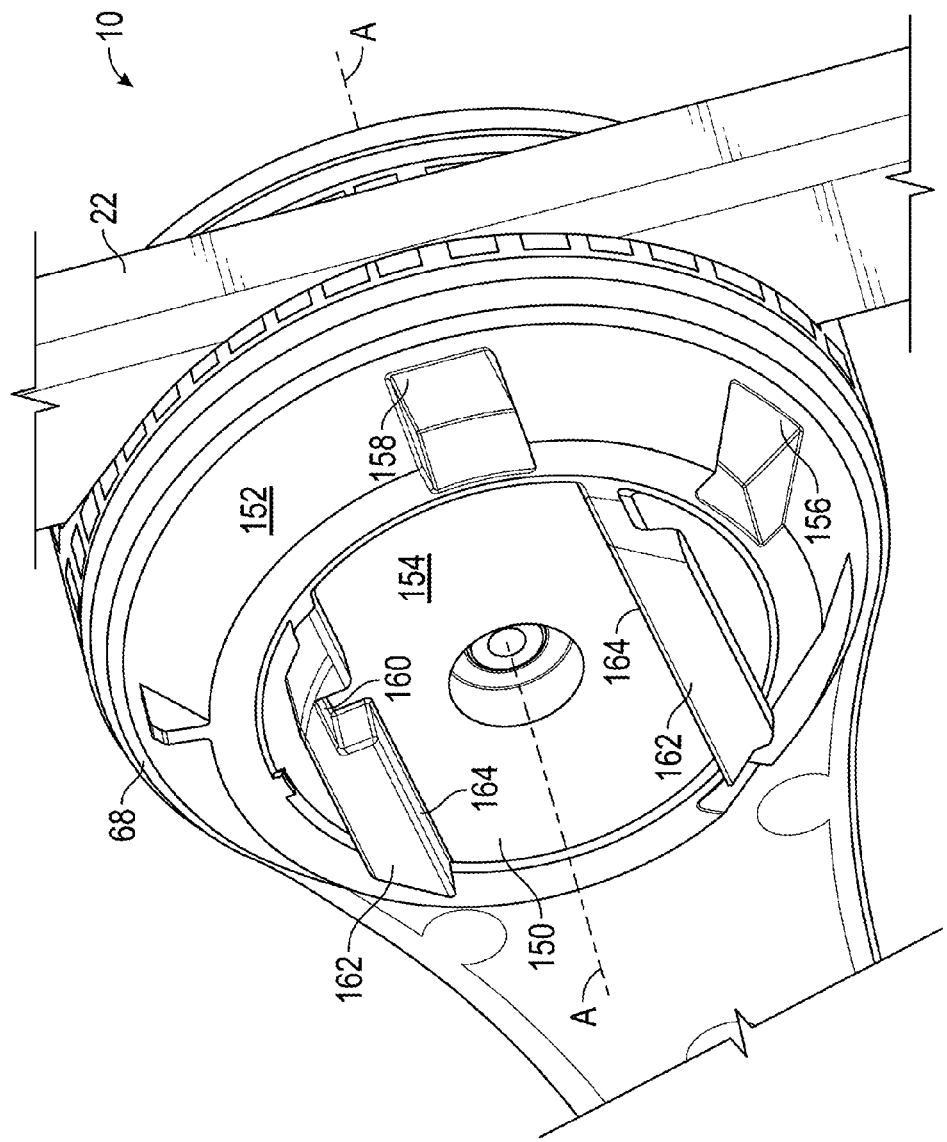
FIG. 8 is a detail of an inner surface of a stroller hub shown in FIG. 1.

FIGS. 7-8 illustrate an inner surface 150 of one of the hubs 68 on the frame 22 of the stroller 10. The hub 68 may include an outer portion 152 and an inner portion 154. The outer portion 152 may be fixed, and therefore unable to rotate about an axis of rotation A-A of the hub 68. However, the rotatable inner portion 154 may be selectively rotatable about the axis of rotation A-A of the hub 68. The outer portion 152 of the hub 68 may include a first engagement slot 156 and a second engagement slot 158. The inner portion 154 of the hub 68 may include a recess 160 and two generally parallel raised surfaces 162 that form a groove 164. The groove 164 of the inner portion 154 of the hub 68 corresponds to the tongue 92 located on the hub 90 of the moveable arm 34 (shown in FIG. 6).

Referring to FIGS. 6-8, the tongue 92 located on the hub 90 of the moveable arm 34 (FIG. 6) may be slidingly received by a corresponding groove 164 located on one of the hubs 68 of the stroller 10 (FIG. 8). The engagement between the tongue 92 located on the hub 90 of the moveable arm 34 and the groove 164 located on the hub 68 of the stroller 10 may be used to secure the moveable arm 34 to the frame 22 of the stroller 10. Specifically, a user may take the moveable arm 34 as seen in FIG. 6 (which is currently detached from the stroller 10), and guide the tongues 92 of both hubs 90 of the moveable arm 34 in the second linear direction L2, and into a corresponding one of the grooves 164 of the hubs 68 of the stroller 10.

The biasing force exerted by the biasing member 96 against the bottom portion 98 of the finger 94 located within the hub 90 of the moveable arm 34 may urge the finger 94 in the upwards direction U. Thus, as the tongue 92 of the hub 90 of the moveable arm 34 is guided into the groove 164 of the hub 68 of the stroller 10, the biasing force exerted by the biasing member 96 may urge the finger 94 into the corresponding recess 160 located within the inner portion 154 of the hub 68 of the stroller 10. As seen in FIG. 7, engagement between the finger 94 and the recess 160 secures the moveable arm 34 to the hub 68 of the stroller 10.

A user may exert a force on the button 84 directed along the first linear direction L1. This force may be used to remove the moveable arm 34 from the frame 22 of the stroller 10. Specifically, the force exerted by the user on the button 84 in the first linear direction L1 may be sufficient in order to overcome the biasing force exerted by the biasing member 116 located within the slot 114 of the slidable arm 104 in the second linear direction L2. Thus, the force exerted by the user on the button 84 in the first linear direction L1 may cause the slidable arm 104 to move in the first linear direction L1. Because the first end 124 of the biasing member 116 may be fixedly attached to the member 54 of the moveable arm 34 by the post 130 (the member 54 is not visible in FIG. 7), movement of the slidable arm 104 in the first linear direction L1 causes the biasing member 116 to compress within the slot 114 of the slidable arm 104. Compression of the biasing member 116 allows for the slidable arm 104 to move in the first linear direction L1.

As the slidable arm 104 moves in the first linear direction L1, the angled section 108 of the slidable arm 104 urges the finger 94 in the hub 90 in a generally downwards direction D. Specifically, as seen in FIG. 6, the recess 106 of the finger 94 receives the angled section 108 of the slidable arm 104. Movement of the slidable arm 104 in the first linear direction L1 may be sufficient to overcome the biasing force exerted in the upwards direction U by the biasing member 96. Thus, once the biasing force exerted by the biasing member 96 is overcome by movement of the slidable arm 104, the sloped profile of the angled section 108 of the slidable arm 108 may guide the finger 94 in the downward direction D.

Removal of the moveable arm 34 from the frame 22 of the stroller 10 may now be described. Specifically, a user may urge the two buttons 84 located on both sides 60 of the moveable arm 34 in the first linear direction L1. This in turn may move the slidable arm 104 in the first linear direction L1 as well. Movement of the slidable arm 104 in the first linear direction L1 causes the finger 94 of the hub 90 of the moveable arm 34 to move in the downward direction D, and thus the finger 94 may retract or withdraw from the recess 160 located on the inner portion 154 of the hub 68 of the stroller 10. In other words, the finger 94 may no longer be received by the recess 160 located within the hub 68 of the stroller 10. Thus, the moveable arm 34 may no longer be fixedly engaged with the stroller 10. The user may now slide the tongues 92 located on each hub 90 of the moveable arm 34 in the first linear direction L1, and out of the recess 160 of the hub 68 of the stroller 10, thereby removing the moveable arm 34 from the frame 22 of the stroller 10.

Referring to FIG. 7, the engagement arm 170 may be used to secure the moveable arm 34 in either the first position (shown in FIGS. 1-2) or the second position (shown in FIG. 3). The engagement arm 170 may include a first end 172, a second end 174, a slot 176, and a biasing member 178. The slot 176 of the engagement arm 170 may include a first end 180 and a second end 182. The biasing member 178 may also include a first end 184 and a second end 186. The first end 184 of the biasing member 178 may be engaged with a post 190 located at the first end 180 of the slot 176. The post 190 may be fixedly attached to the member 54 of the moveable arm 34 (the member 54 is not visible in FIG. 7). The second end 186 of the biasing member 178 may be engaged with the second end 182 of the slot 176. The biasing force exerted by the biasing member 178 against the slot 176 of the engagement arm 170 may be used to keep the engagement arm 170 normally biased in the second linear direction L2.

The first end 172 of the engagement arm 170 may include an aperture 192 that receives a first end 196 of a cable 194. Referring to both FIGS. 7-8, the second end 174 of the engagement arm 170 may selectively engage with either the first engagement slot 156 or the second engagement slot 158 of the outer portion 152 of the hub 68 of the stroller 10 in order to secure the moveable arm 34 in either the first position or the second position. Specifically, if the second end 174 of the engagement arm 170 is engaged with the first slot 156 of the hub 68, then the moveable arm 34 may be in the first position (FIGS. 1-2). Similarly, if the second end 174 of the engagement arm 170 is engaged with the second slot 158 of the hub 68, then the moveable arm 34 may be in the second position (FIG. 3).

Figure 9:
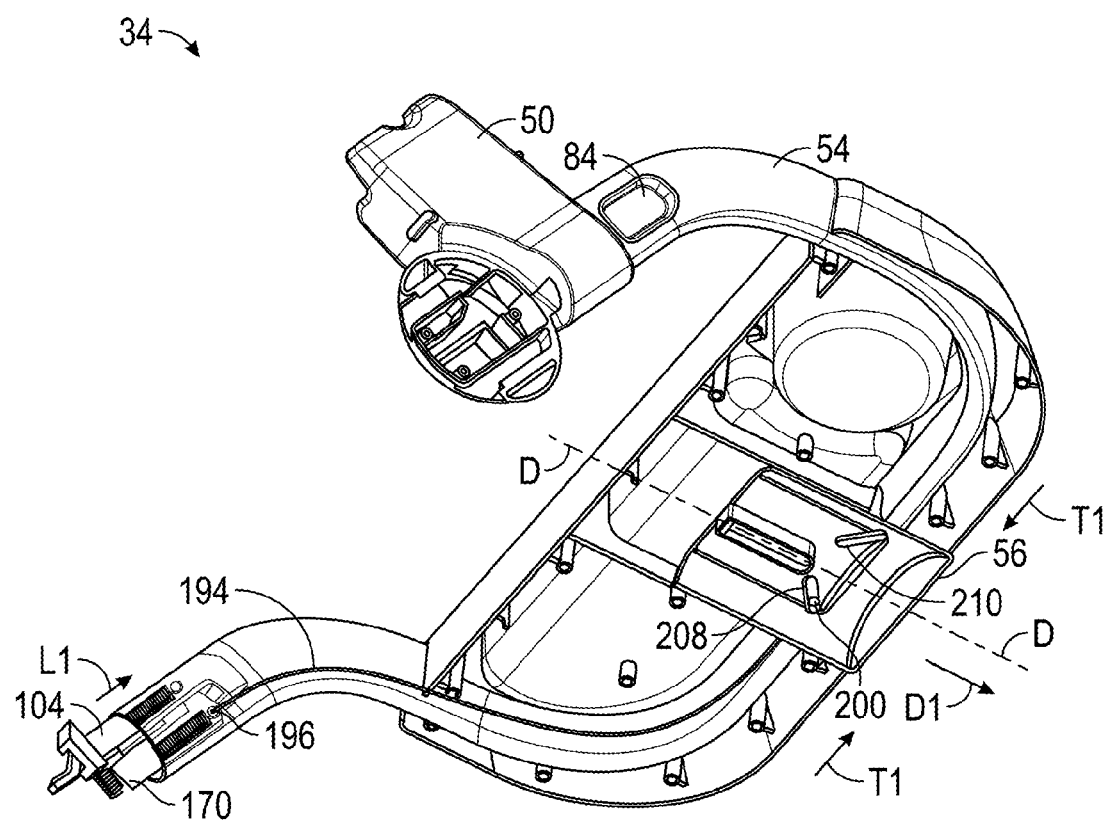
FIG. 9 is a view of the moveable arm shown in FIG. 6.

The engagement arm 170 may be urged in the first linear direction L1 to disengage with either the first slot 156 or the second slot 158 of the hub 68 of the stroller 10 by pulling the handle 56 located along the bottom surface 58 of the tray 36 in the linear direction D1. Turning to FIG. 9, the moveable arm 34 is illustrated. One of the members 54 and the hub 90 are omitted in order to reveal the slidable arm 104, the engagement arm 170, and a portion of the cable 194. A lower shell 198 of the tray 36 (seen in FIG. 7) is also omitted as well, in order to reveal the entire handle 56. As seen in FIG. 9, the handle includes a pair of inwardly extending slots 208, 210. A second end 200 of the cable 194 may be engaged with one of the slots 208 located in the handle 56. It should be noted that while only one cable 194 is illustrated, the other side of the moveable arm 34 also includes a cable as well, which engages with the slot 210.

When a user pulls the handle 56 in the direction D1, the slots 208, 210 also move in the direction D1. Movement of the slots 208, 210 in the direction D1 may urge the cable 194 in a direction T1. The direction T1 is oriented inwardly towards an axis of symmetry D-D of the moveable arm 34. As the cable 194 is urged in the direction T1, this may also urge the engagement arm 170 in the first linear direction L1. Referring to FIGS. 7-9, urging the engagement arm 170 in the first linear direction L1 may cause the second end 174 of the engagement arm 170 to disengage with either the first engagement slot 156 or the second engagement slot 158 located on the outer portion 152 of the hub 68 of the stroller 10. Once the second end 174 of the engagement arm 170 is disengaged with either the first engagement slot 156 or the second engagement slot 158, the moveable arm 34 may be rotated about the hubs 68 of the stroller 10.

Rotation of the moveable arm 34 from the first position (FIGS. 1-2) into the second position (FIG. 3) may now be explained. Referring generally to FIGS. 2-3 and 6-9, if the moveable arm 34 is in the first position, the second end 174 of the engagement arm 170 may be engaged with the first engagement slot 156 located on the hub 68 of the stroller 10. A user may pull the handle 56 located on the tray 36 of the moveable arm 34 in the direction D1, thereby causing the second end 174 of the engagement arm 170 to disengage with the first engagement slot 156 located on the outer portion 152 of the hub 68 of the stroller 10. A user may now rotate the moveable arm 34 about the hubs 68 of the stroller 10 in a counterclockwise direction, and towards the second engagement slot 158 located on the hub 68. As the engagement arm 170 approaches the second engagement slot 158 located on the outer portion 152 of the hub 68, the biasing force exerted by the spring 178 positioned within the slot 176 of the engagement arm 170 may urge the second end 174 of the engagement arm 170 into the second engagement slot 158 of the hub 68. The moveable arm 34 may now be secured in the second position (shown in FIG. 3).

Figure 10:
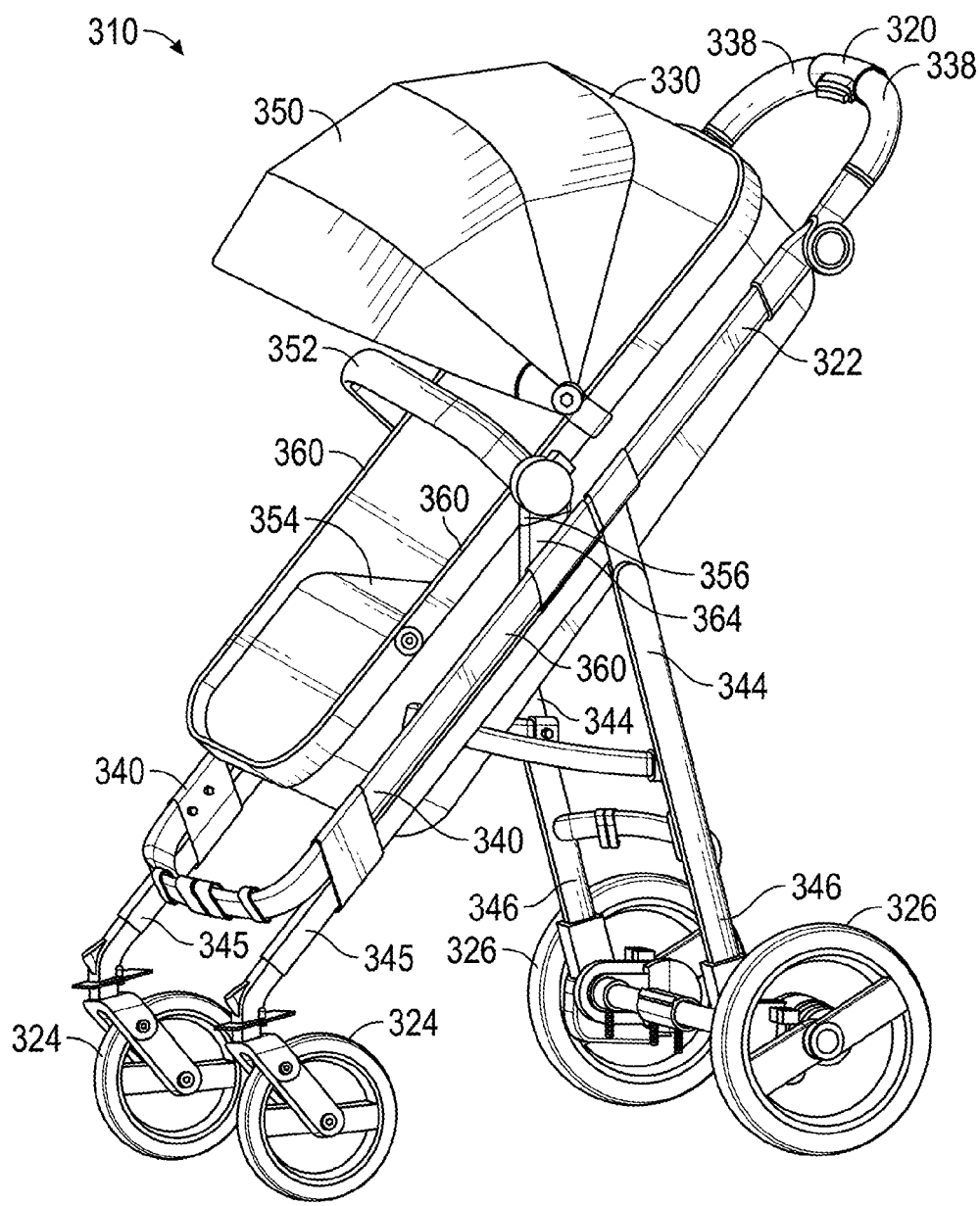
FIG. 10 is a perspective of an alternative embodiment of a stroller, where a pram or carry cot is engaged with a frame of a stroller.
Figure 11:
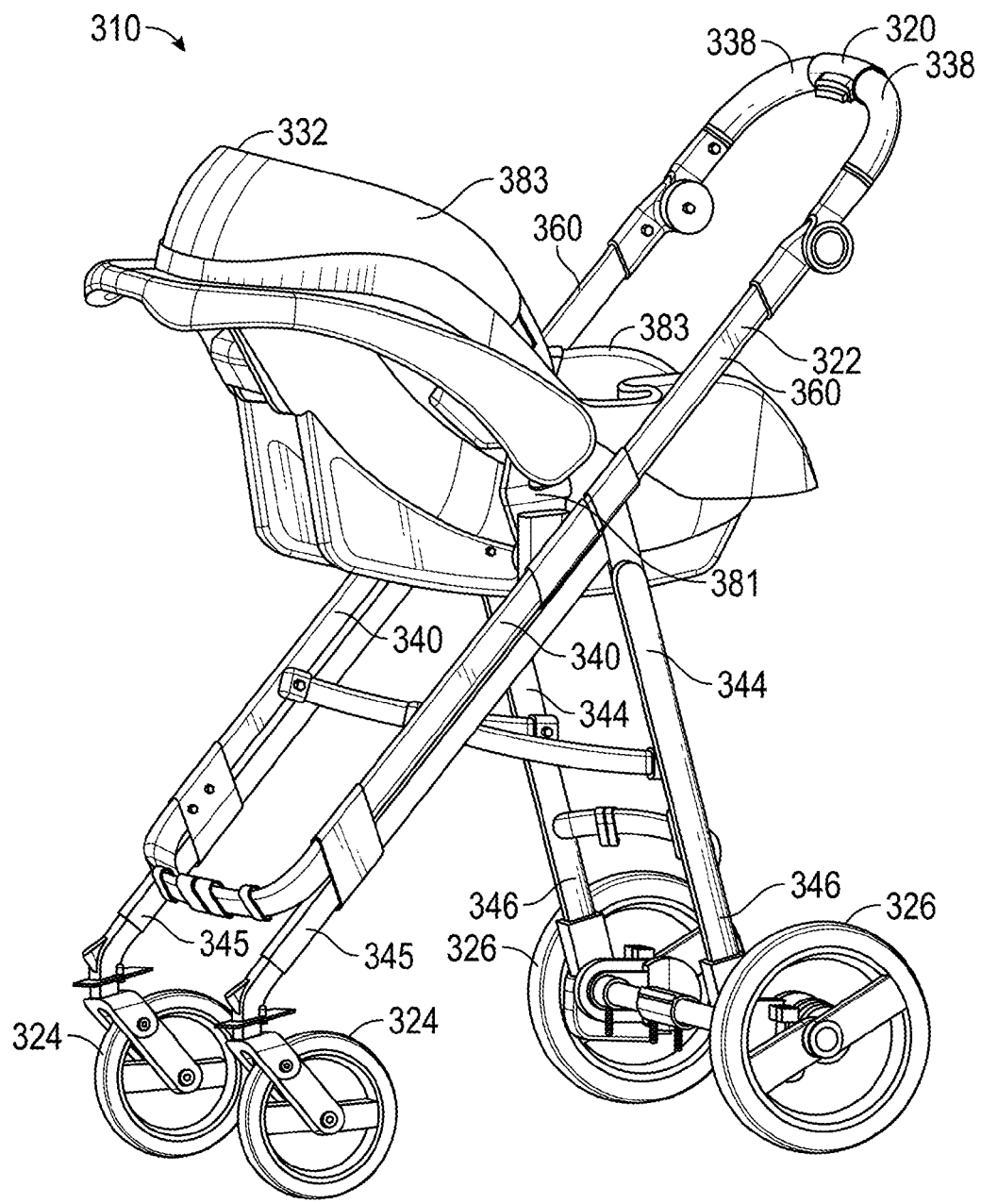
FIG. 11 is a perspective of the stroller shown in FIG. 10, where an infant seat is engaged with a frame of a stroller.

FIGS. 10-11 illustrate an alternative embodiment of a stroller 310. The stroller 310 may include a handle 320, a frame 322, a set of front wheels 324, and a set of rear wheels 326. In the embodiment as shown in FIG. 10, a pram or carry cot 330 may be selectively engaged with the frame 322 of the stroller 310. The carry cot 330 may be used to seat a child. However, a user may remove the carry cot 330 from the frame 322 of the stroller 310. The user may replace the carry cot 330 with an infant seat 332, which is illustrated in FIG. 11. The infant seat 332 may also be selectively engaged with the frame 322 of the stroller 310. Thus, the stroller 310 may be used to transport children using either the carry cot 330 (shown in FIG. 10), or the infant seat 322 (shown in FIG. 11).

The handle 320 of the stroller 310 may include two gripping portions 338. The frame 322 of the stroller 310 may include two front members 340 and two rear members 344. Each of the front wheels 324 of the stroller 310 may be connected to a bottom portion 345 of one of the front members 340 of the stroller 310. Each of the rear wheels 326 of the stroller 310 may be connected to a bottom portion 346 of one of the rear members 344 of the stroller 310. In one embodiment, the frame 322 of the stroller 310 may be foldable between a collapsed position (not illustrated) and a deployed position as shown in FIGS. 10-11.

In the embodiment as shown in FIG. 10, the carry cot 330 is in a front-facing position with respect to the frame 322 of the stroller 310. However, it is to be understood that the carry cot 330 may also be placed in a rear-facing position with respect to the frame 322 of the stroller 310 as well (the rear-facing position is not illustrated). The carry cot 330 may include a canopy 350, a handle 352, a seat portion 354, and two extensions 356 (only one of the extensions are visible in FIG. 10). The two extensions 356 may be located on opposing sides 360 of the stroller 310.

Figure 12:
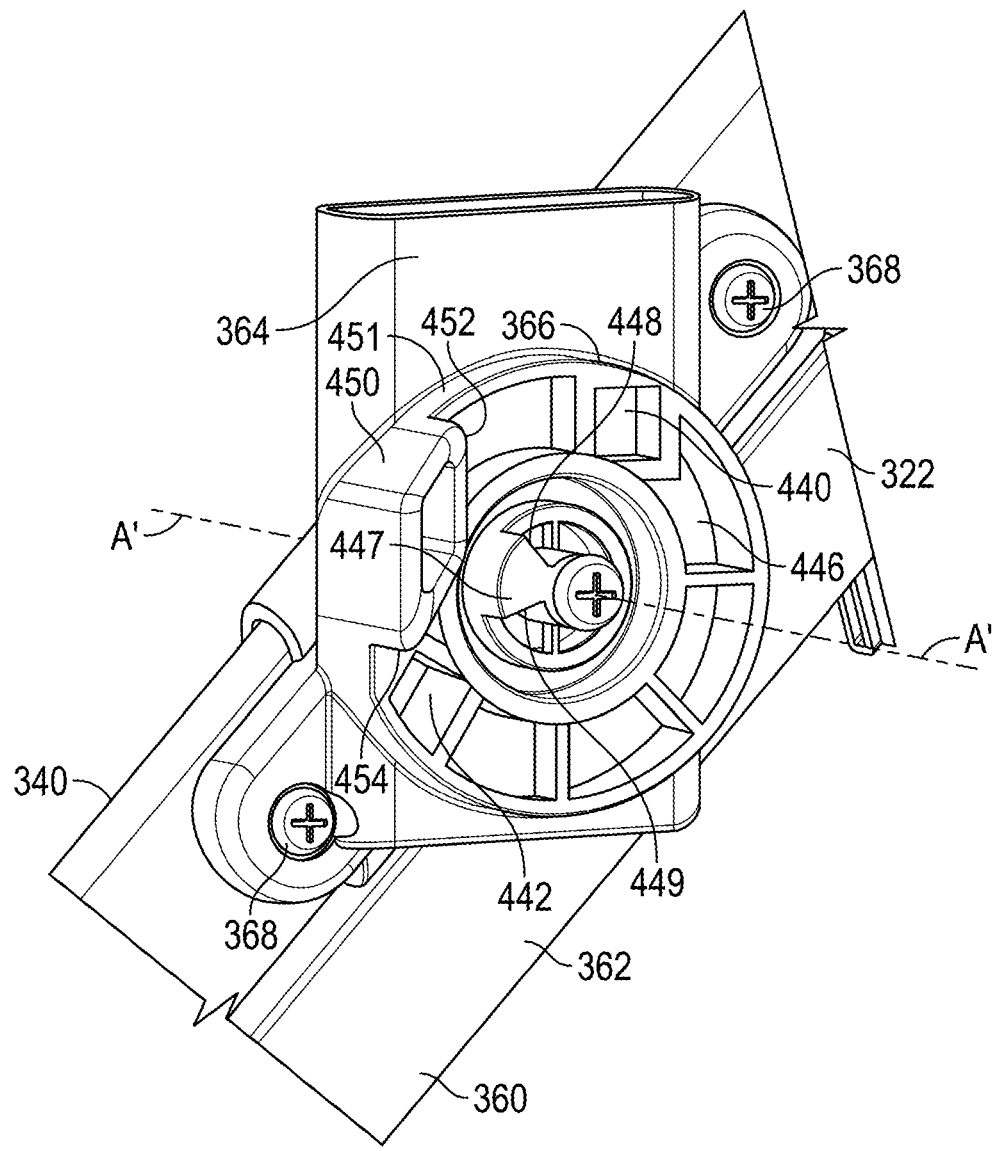
FIG. 12 is a detail of an inner side of a front member of the stroller shown in FIGS. 10-11.

FIG. 12 is an enlarged view of an inner side 362 of one of the front members 340 located on one side 360 of the stroller 310. As seen in FIG. 12, the inner side 362 of the front member 340 of the stroller 310 may include a receiving member 364. The receiving member 364 of the stroller 310 may be configured to receive and engage with one of the extensions 356 of the carry cot 330 (seen in FIG. 10). This engagement between the receiving member 364 and the extension 356 secures the carry cot 330 to the frame 322 of the stroller 310. The receiving member 364 may be part of a hub 366. The hub 366 may be fixedly attached to the frame 322 of the stroller 310. For example, in the non-limiting embodiment as shown in FIG. 12, the hub 366 may be attached to the inner side 362 of the front member 340 of the stroller 310 using a plurality of fasteners 368. It should be noted that while only one of the hubs 366 located on one side 360 of the stroller 310 is shown in FIG. 12, the remaining side 360 of the stroller 310 (shown in FIGS. 10-11) may be a mirror image, and includes the same componentry.

Figure 13:
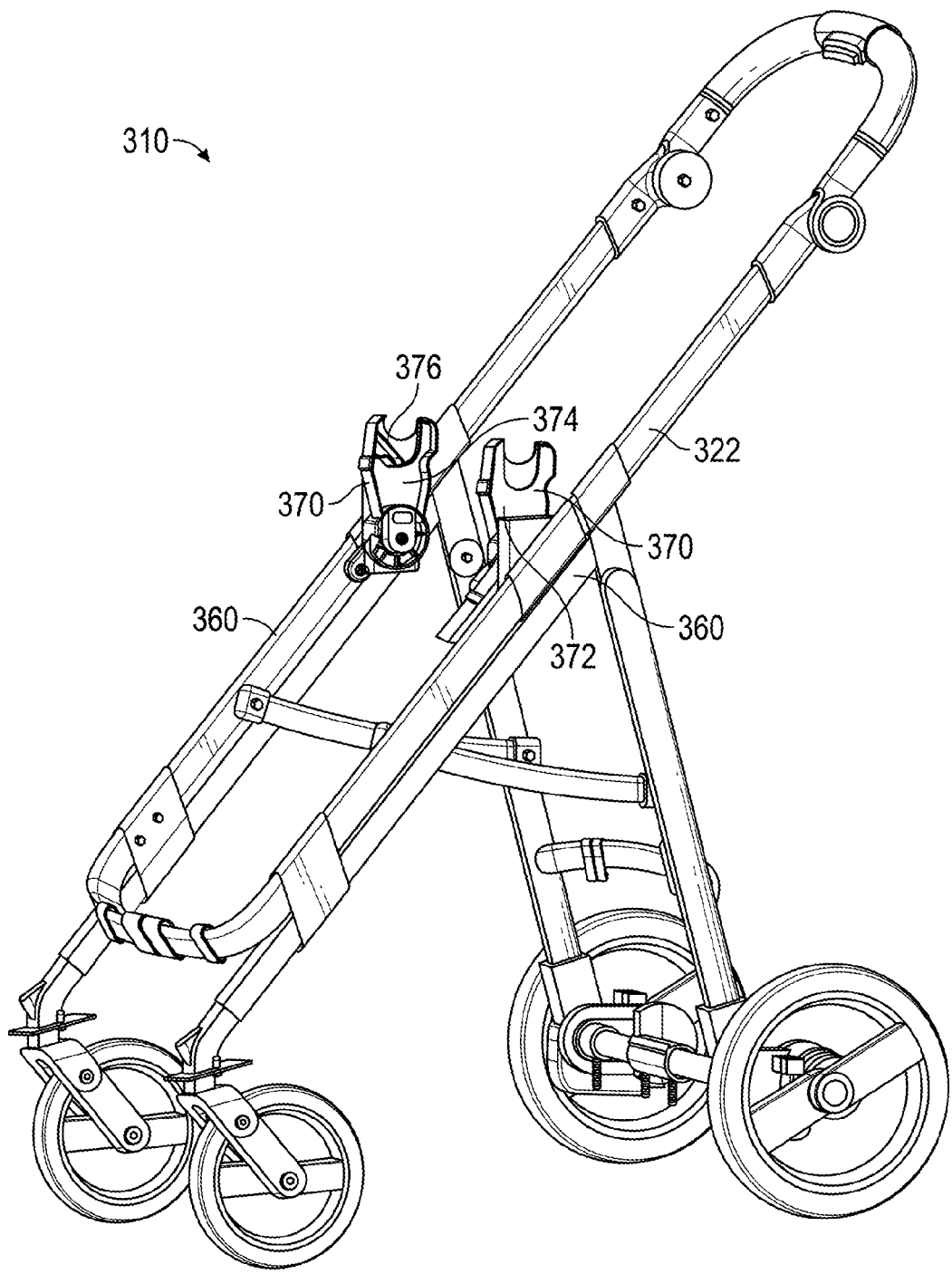
FIG. 13 is a perspective of the stroller frame, where a set of adapters of the stroller are in a first position.

Referring generally to FIGS. 10-14, a user may remove the carry cot 330 from the frame 322 of the stroller 310 and install the infant seat 332. Specifically, as seen in FIG. 13, the frame 322 of the stroller 310 may include a set of adapters 370. The adapters 370 may be used to selectively engage with and secure the infant seat 332 (illustrated in FIG. 11) to the frame 322 of the stroller 310. One of the adapters 370 may be positioned on one side 360 of the stroller 310, and the remaining adapter 370 may be positioned on the other side 360 of the stroller 310. The adapters 370 may each be independently rotatable about an axis of rotation A-A' of a corresponding hub 366 of the frame 322 of the stroller 310 (the axis of rotation A-A' is shown in FIG. 12). Specifically, each adapter 370 may be rotatable about a corresponding one of the hubs 366 between a first position (seen in FIG. 13) and a second position (seen in FIG. 14).

Referring to FIG. 13, when in the first position, the adapters 50 may project upwardly and be easily viewed by a user. Moreover, the adapters 370 may be positioned to engage with the infant seat 332 (shown in FIG. 11). Each adapter 370 may include a front side 372 and a rear side 374. The rear side of each adapter 370 may include a mating feature 376. The mating feature 376 may be a projection that extends outwardly from the rear side 374 of the adapter 370.

Figure 15:
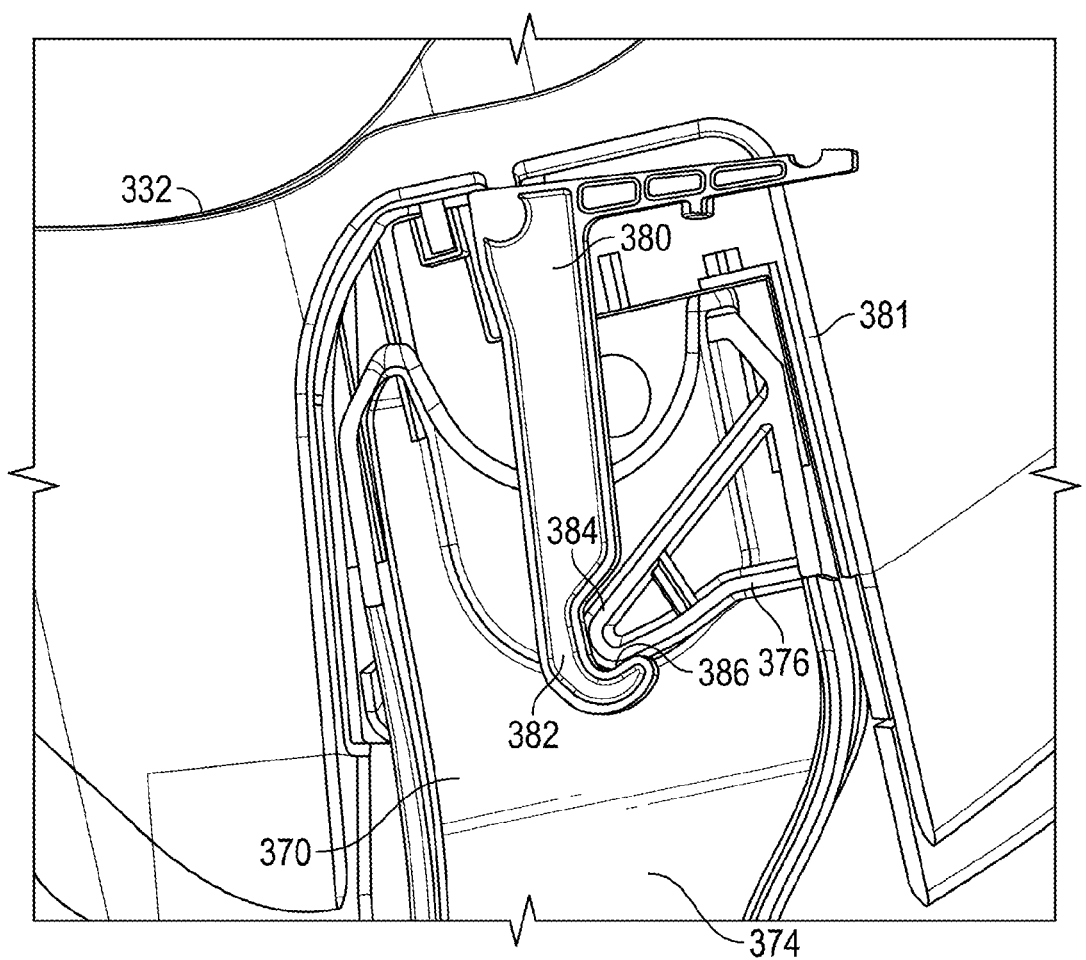
FIG. 15 is a cross-section of a rear side of one of the adapters of the stroller and a corresponding attachment device located on the infant seat shown in FIG. 11.

Referring to FIG. 11, the infant seat 332 may include opposing sides 383, where a receiving member 381 may be located on each side 383 of the infant seat 332. Similar to the embodiment as shown in FIGS. 1-9, each receiving member 381 may include an attachment device 380 (seen in FIG. 15) located therein. FIG. 15 is a cross-section of one of the receiving members 381 of the infant seat 332, where a corresponding adapter 370 and the attachment device 380 located within the receiving member 381 may be viewed. The attachment device 380 may include a hook-shaped member 382. The hook-shaped member 382 of the attachment device 380 may be sized to receive and engage with the mating feature 376 located along the rear side 374 of the adapter 370. The mating feature 376 of the adapter 370 may include an outer periphery 384 that generally corresponds with an inner surface 386 of the hook-shaped member 382. It should be noted that while FIG. 15 illustrates a hook-shaped member and a projection to engage the adapter 370 of the stroller 310 with the infant seat 332, other approaches may be used as well to secure the infant seat 332 to the stroller 310.

Referring back to FIGS. 11-14, a user may remove the infant seat 332 from the adapters 370. The user may then rotate each of the adapters 370 independently from one another in a clockwise direction from the first position (seen in FIG. 13) and into the second position (seen in FIG. 14). When in the second position, the adapters 370 may be positioned at an angle α' with respect to vertical line V. The carry cot 330 (shown in FIG. 10) may now be attached to the frame 322 of the stroller 310. Moreover, when the adapters 370 are in the second position, the front members 340 located on both sides 360 of the stroller 310 may generally obstruct or hide at least a portion of the adapters 370 from view. Specifically, when an individual views the stroller 310 along one of the sides 360, at least a portion of each adapter 370 may each be substantially hidden by a portion of one of the front members 340 of the stroller 310. Hiding the adapters 370 when the infant seat 332 is not in use may be beneficial, as some individuals may not find the upwardly projecting adapters 370 as seen in FIG. 13 to be aesthetically pleasing.

Figure 14:
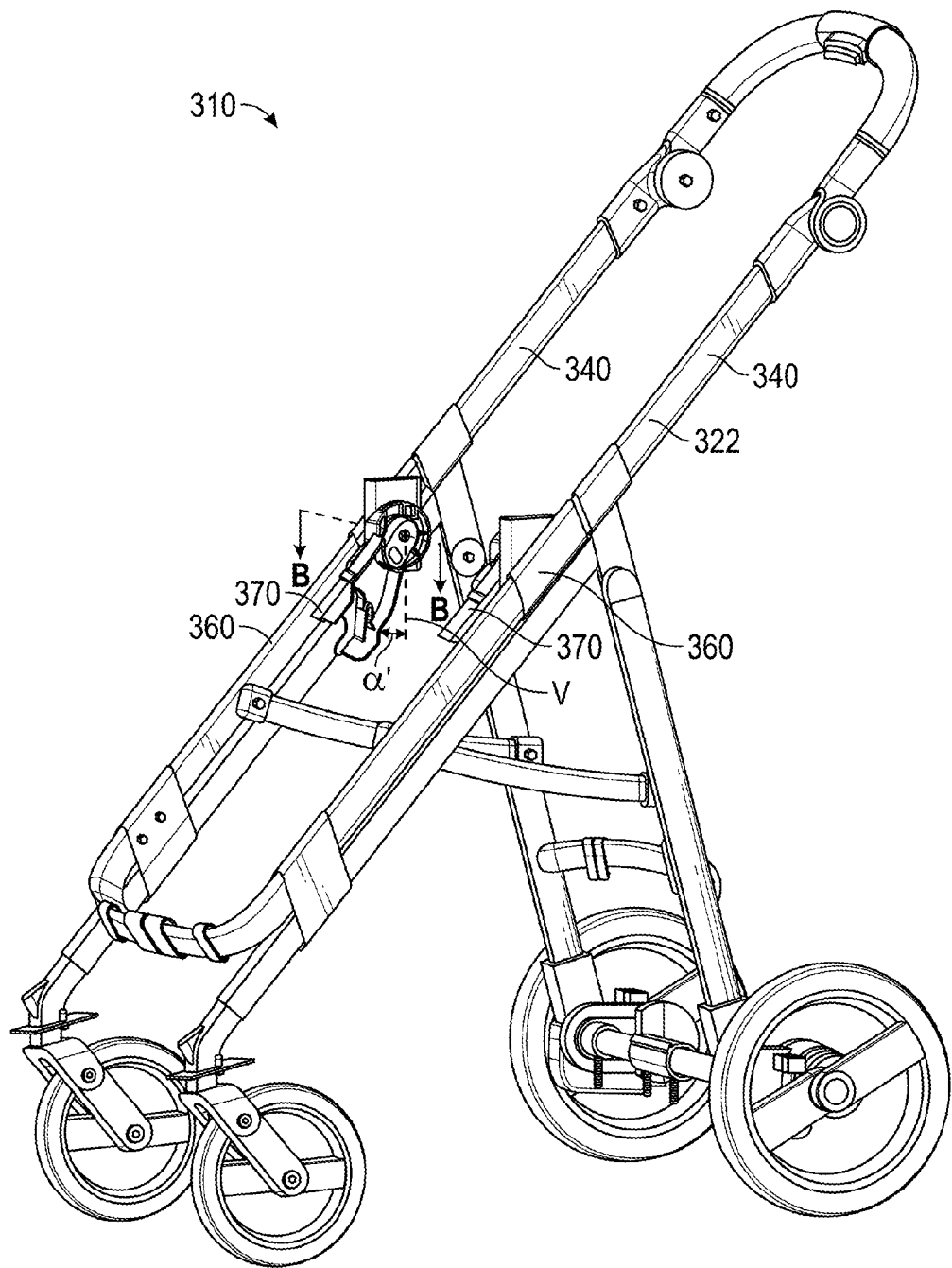
FIG. 14 is a perspective of the stroller frame, where a set of adapters of the stroller are in a second position.
Figure 16:
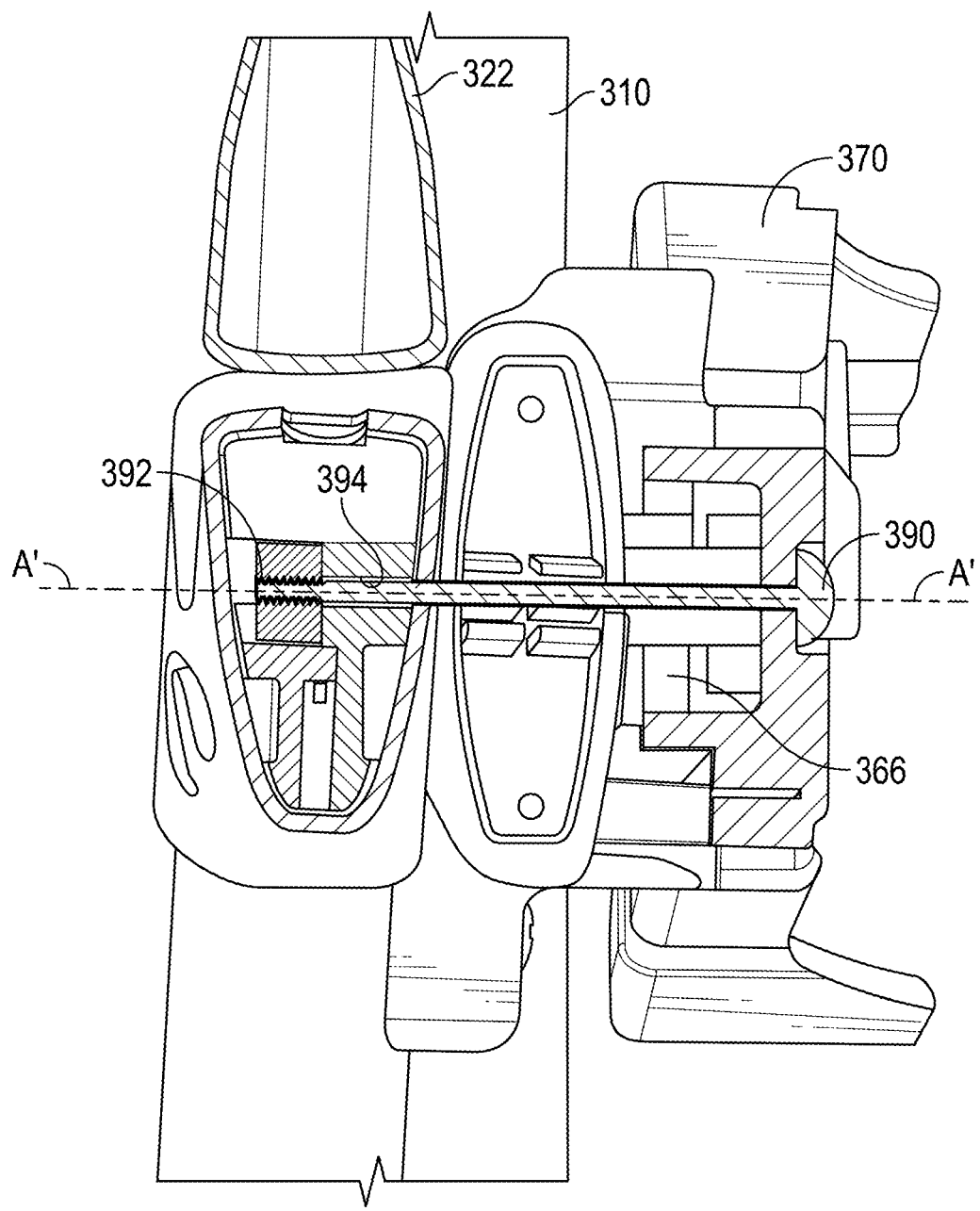
FIG. 16 is a cross-section of one of the adapters and a portion of the frame of the stroller taken along section line B-B in FIG. 14.

FIG. 16 is a cross-sectional view of a portion of the frame 322 of the stroller 310 and one of the adapters 370, taken along section line B-B in FIG. 14. A fastening member 390 may be used to secure one of the adapters 370 to a corresponding hub 366 of the stroller 310. The fastening member 390 may be oriented along the axis of rotation A-A' of the hub 366 of the stroller 310. As seen in FIG. 16, the fastening member 390 may include a distal end 392 threadingly engaged with a corresponding mating hole 394 located within the frame 322 of the stroller 310. The adapter 370 may be rotatable about the axis of rotation A-A' of the hub 366 between the first position and the second position. It should be noted that while only one of the adapters 370 is shown in FIG. 16, the adapter 370 located on the opposing side 360 of the stroller 310 may be a mirror image.

Figure 17:
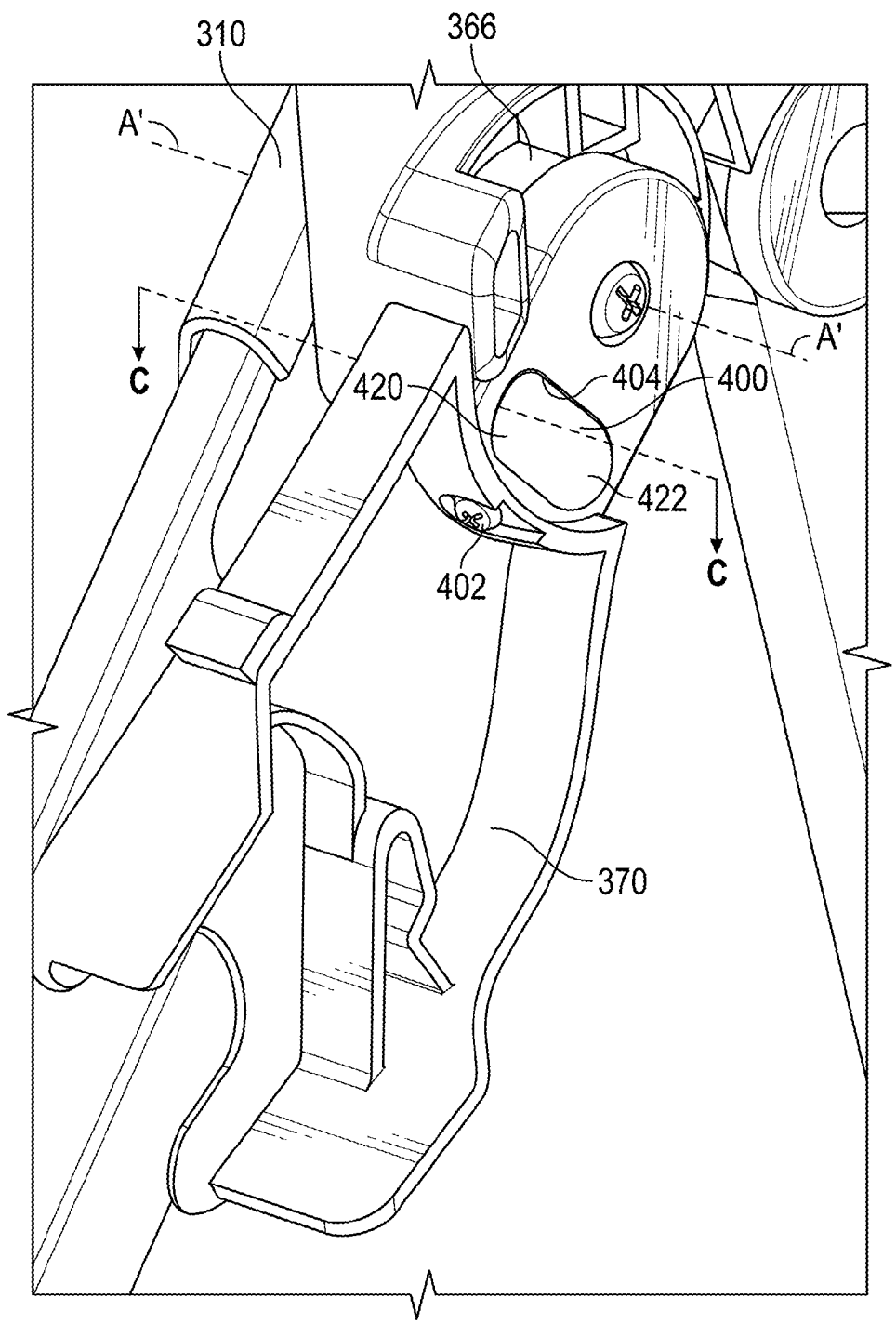
FIG. 17 is a perspective view of one of the adapters shown in FIG. 13 in the second position.

Referring to FIG. 17, the adapter 370 may also include a toggle button 400 and a second fastening member 402. The toggle button 400 may be received by a corresponding aperture 404 located within the adapter 370. The toggle button 400 may be used to secure the adapter 370 in either the first position or the second position. The second fastening member 402 may be oriented radially outward with respect to the axis of rotation A-A' the hub 366 of the stroller 310. The second fastening member 402 may be used to secure the toggle button 400 to the adapter 370.

Figure 18:
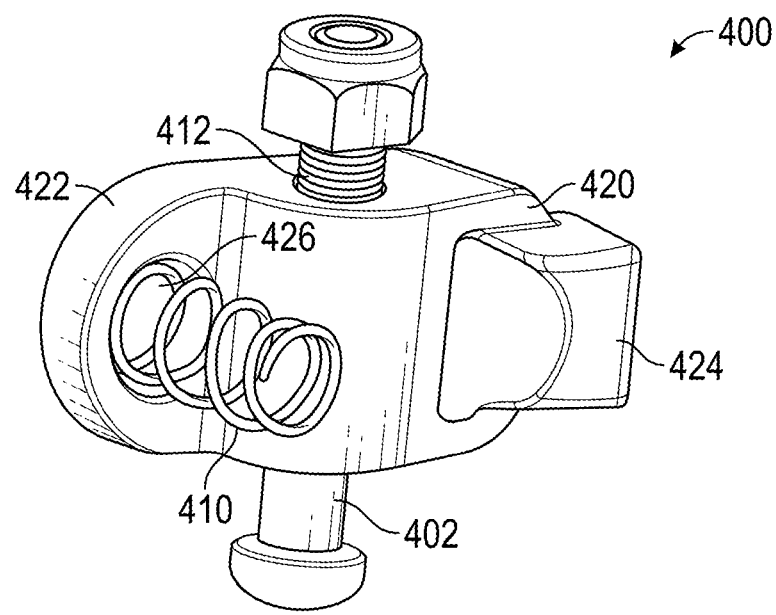
FIG. 18 is a perspective view of a toggle button shown in FIG. 17.
Figure 19:
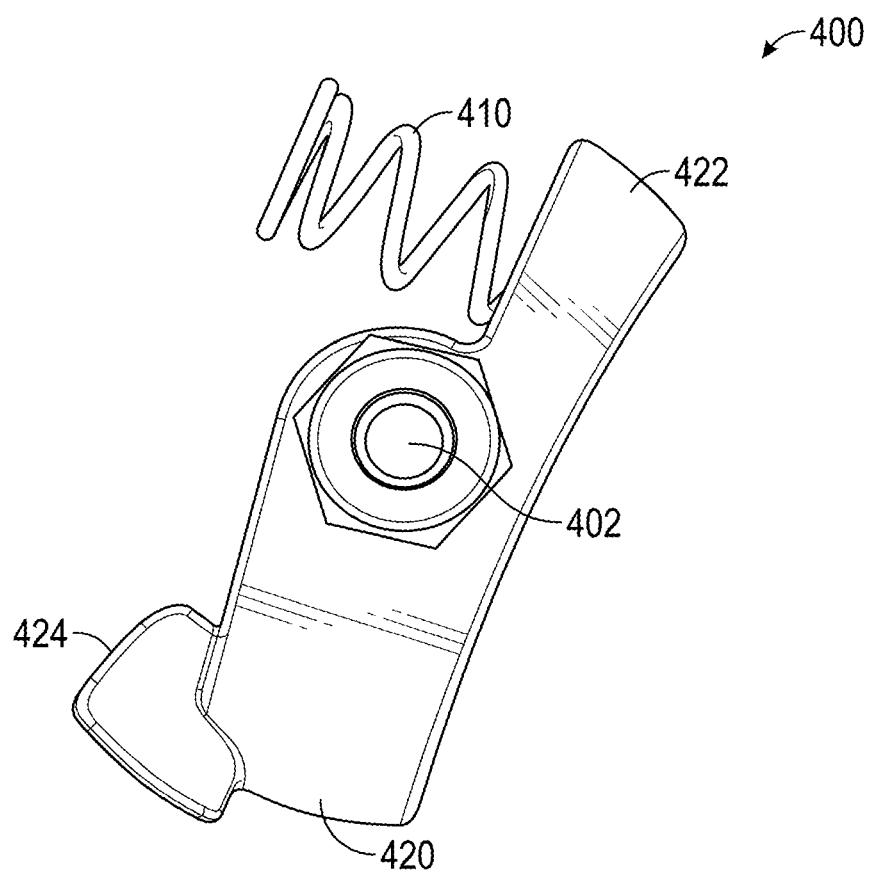
FIG. 19 is a top view of the toggle button shown in FIG. 17.

FIGS. 18-19 illustrate the toggle button 400, the second fastener 402, and a biasing member 410, where the toggle button 400 may pivot about the second fastening member 402. The toggle button 400 may include an aperture 412 for receiving the second fastener member 402. The toggle button 400 may also include a first end portion 420 and a second end portion 422. The aperture 412 of the toggle button 400 may be located between the first end portion 420 and the second end portion 422. The toggle button 400 may also include a mating feature 424 and a recess 426 (shown in FIG. 18). The mating feature 424 may be located at the first end portion 420 of the toggle button 400. The mating feature 424 may include a generally curved or rounded profile configured to selectively engage with either a first engagement feature 440 or a second engagement feature 442 located on a corresponding one of the hubs 366 of the stroller 310 (seen in FIG. 12), and is described in greater detail below. The recess 426 of the toggle button 400 may be located at the second end portion 422 of the toggle button 400. The recess 426 of the toggle button 400 may be sized to receive a portion of the biasing member 410.

Figure 20:
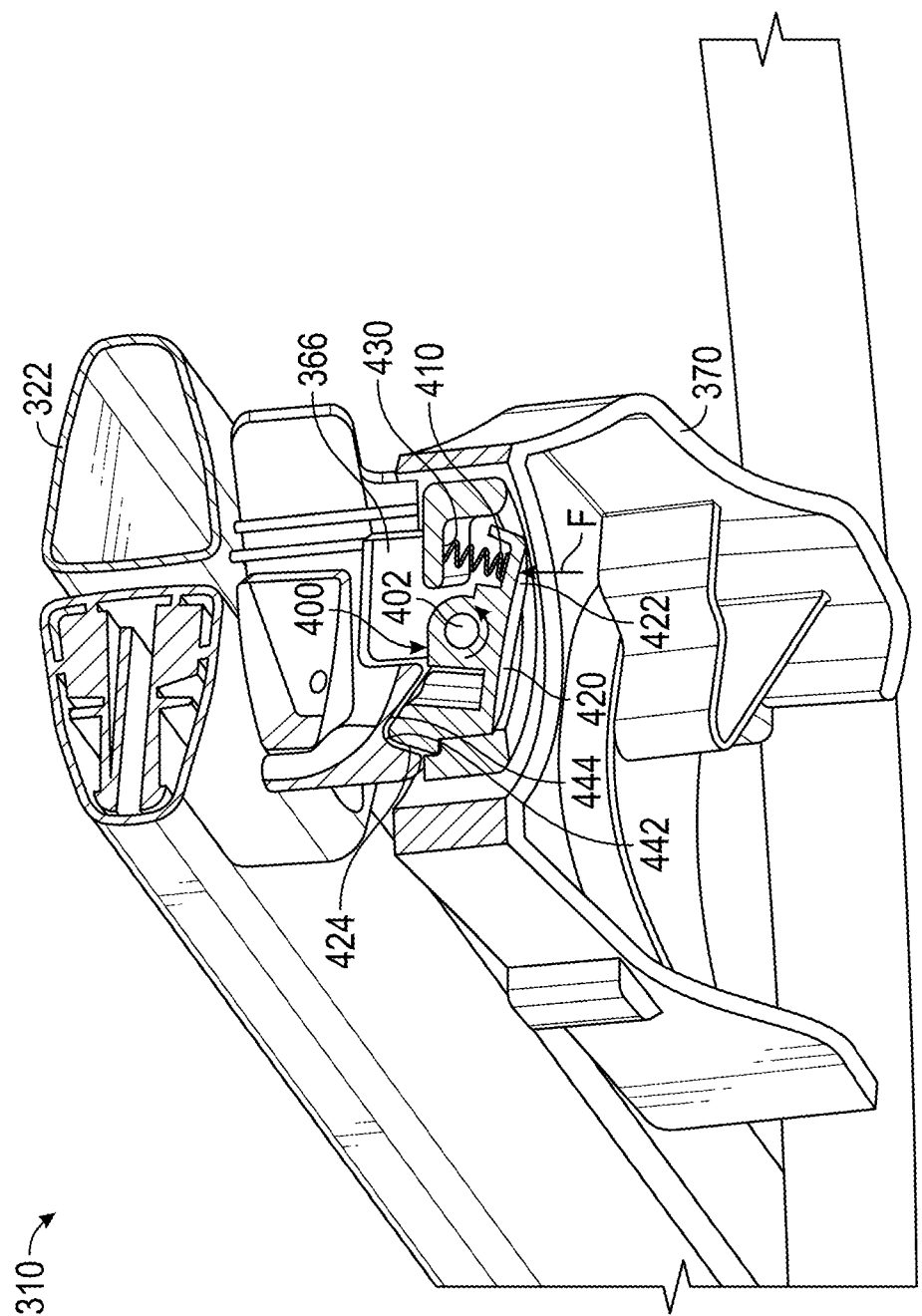
FIG. 20 is a cross-section of one of the adapters and a portion of a frame of the stroller taken along section line C-C in FIG. 17.

Turning back to FIG. 17, the adapters 370 is illustrated in the second position, where the second end portion 422 of the toggle button 400 may be oriented outwardly away from the hub 366 of the stroller 310. FIG. 20 is a cross sectional view of the adapter 370, the toggle button 400, and a portion of the frame 322 of the stroller 310 shown in FIG. 17, taken along section line C-C. Referring to FIGS. 17-20, the biasing member 410 may be located between the recess 426 of the toggle button 400 (seen in FIG. 18) and an interior surface 430 of the adapter 370. The biasing member 410 may exert a biasing force in a direction oriented outwardly away from the adapter 370. The biasing force exerted by the biasing member 410 may keep the second end portion 422 of the toggle button 400 outwardly away from the hub 366 of the stroller 310.

Turning to FIG. 12, each hub 366 located on the frame 322 of the stroller 310 may include two engagement features, namely the first engagement feature 440 and the second engagement feature 442. Both the first engagement feature 440 and the second engagement feature 442 may be located along an inner surface 446 of the hub 366, and positioned radially outward from the axis of rotation A-A'. Both of the first engagement feature 440 and the second engagement feature 442 may be recesses or indentations located within the hub 366 of the stroller 310. The first engagement feature 440 and the second engagement feature 442 of the hub 366 may be configured to receive and secure the mating feature 424 located at the first end portion 420 of the toggle button 400 (shown in FIG. 18). Specifically, when the adapter 370 is in the first position, the mating feature 424 of the toggle button 400 (shown in FIG. 18) may be received by the first engagement feature 440 located on the hub 366. This engagement between the mating feature 424 of the toggle button 400 and the first engagement feature 440 located on the hub 366 may be used to secure the adapter 370 in the first position. Similarly, when the adapter 370 is in the second position, the mating feature 424 of the toggle button 400 (shown in FIG. 18) may be received by the second engagement feature 442 located on the hub 366. This engagement between the mating feature 424 of the toggle button 400 and the second engagement feature 442 located on the hub 366 may be used to secure the adapter 370 in the second position.

FIG. 20 illustrates the adapter 370 secured in the second position, where the engagement between the mating feature 424 of the toggle button 400 and the second engagement feature 442 located on the hub 366 is visible. As seen in FIG. 20, the mating feature 424 of the toggle button 400 may be a generally rounded or curved profile that generally corresponds with an outer surface 444 of the second engagement feature 442 of the hub 366. In order to disengage the toggle button 400 from the hub 366, a user may exert a force F against the second end 422 of the toggle button 400 in a direction towards the hub 366 of the stroller 310. The force F exerted on the second end 422 of the toggle button 400 may be sufficient to overcome the biasing force exerted by the biasing member 410. The toggle button 400 may then pivot in the counterclockwise direction about the second fastening member 402, which causes the mating feature 424 of the toggle button 400 to be urged out of the second engagement feature 442 located on the hub 366.

Once the mating feature 424 of the toggle button 400 is no longer received by the second engagement feature 442 located on the hub 366, the adapter 370 is no longer secured in the second position. Thus, a user may rotate the adapter 370 in a counterclockwise direction from the second position (seen in FIG. 14) and into the first position (seen in FIG. 13). Referring to FIGS. 12 and 20, as the mating feature 424 of the toggle button 400 approaches the first engagement feature 440 located on the hub 366 (seen in FIG. 12), the biasing force exerted by the biasing member 410 may urge the mating feature 424 of the toggle button 400 into the first engagement feature 440 located on the hub 366. The adapter 370 may now be secured in the first position. It should be noted that while disengagement of the mating feature 424 of the toggle button 400 with the second engagement feature 442 located on the hub 366 is described, a similar process may be used to disengage the mating feature 424 of the toggle button 400 from the first engagement feature 440 located on the hub 366.

Referring to FIG. 12, each hub 366 may also include an inner stopper 447 and an outer stopper 450, where the inner stopper 447 may be located radially inward with respect to the outer stopper 450. The inner stopper 447 may be a raised surface that projects outwardly from the inner surface 446 of the hub 366, and may be located around the axis of rotation A-A' of the hub 366. The inner stopper 447 may include a first stopper surface 448 and a second stopper surface 449. The outer stopper 450 may also be a raised surface that projects outwardly from the inner surface 446 of the hub 366, and may be located along an outer periphery 451 of the hub 366. The outer stopper 450 may include a first stopper surface 452 and a second stopper surface 454.

Figure 21:
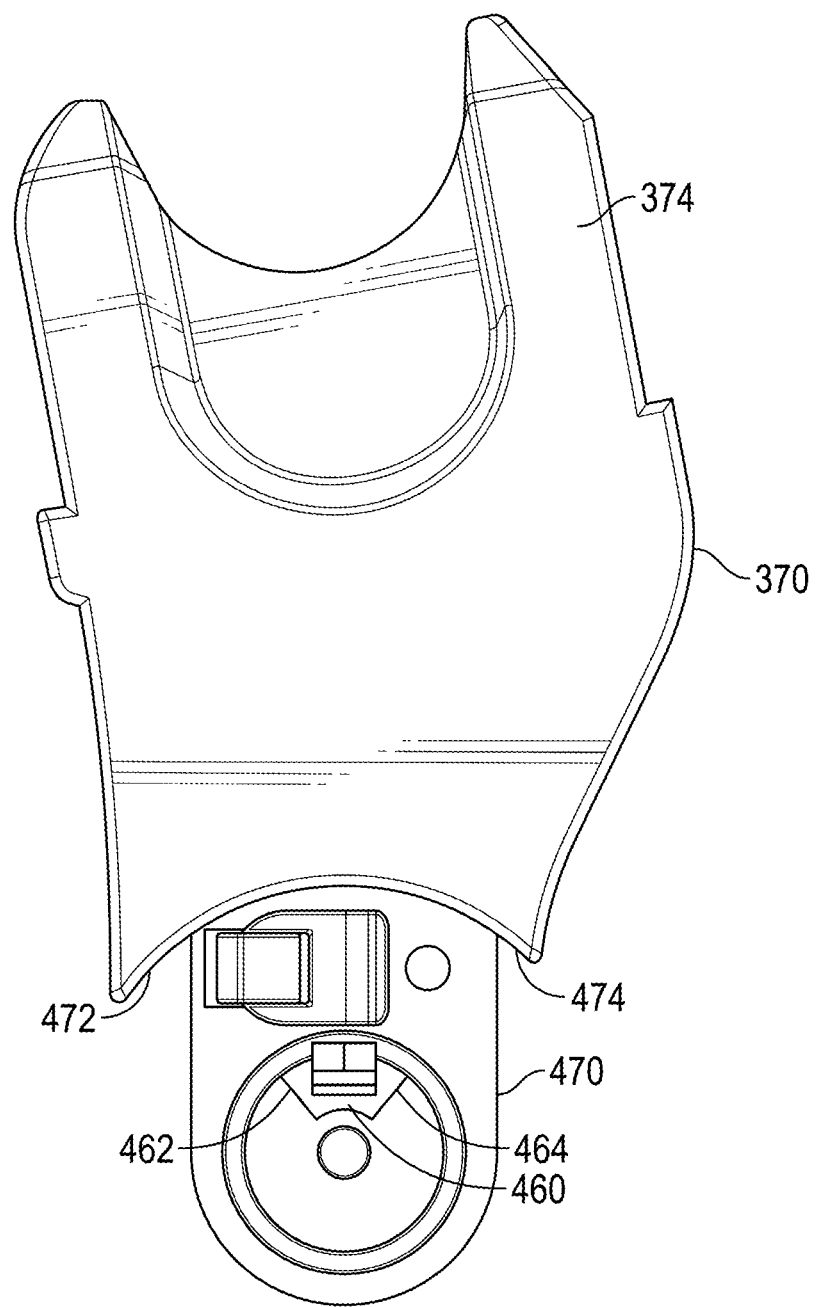
FIG. 21 is a view of a rear surface of one of the adapters shown in FIG. 13.

FIG. 21 is an illustration of the rear side 374 of one of the adapters 370. A stopper 460 may be located on the rear side of the adapter 370. The stopper 460 may be a raised surface that projects outwardly from the rear side 374 of the adapter 370. The stopper 460 may include a first abutment surface 462 and a second abutment surface 464. The first abutment surface 462 of the engagement stop 460 of the adapter arm may be configured to abut against the first stopper surface 448 of the inner stopper 450 of the hub 366 (the hub 366 is shown in FIG. 12) when the adapter 370 is in the first position (FIG. 13). Similarly, the second first abutment surface 464 of the engagement stop 460 of the adapter arm 360 may be configured to abut against the second stopper surface 449 of the inner stopper 450 of the hub 366 (the hub 366 is shown in FIG. 12) when the adapter 370 is in the second position (FIG. 14).

An outer periphery 470 of the adapter 370 may define a first angled portion 472 and a second angled portion 474. In the non-limiting embodiment as shown in FIG. 21, the first angled portion 472 and the second angled portion 474 of the adapter 370 may be in the form of an acute angle, which has a generally V-shaped profile. The first angled portion 472 of the adapter 370 may be configured to abut against the first stopper surface 452 of the outer stopper 450 of the hub 366 (the hub 366 is shown in FIG. 12) when the adapter 370 is in the first position (FIG. 13). Similarly, the second angled portion 474 of the adapter 370 may be configured to abut against the second stopper surface 454 of the outer stopper 450 of the hub 366 (the hub 366 is shown in FIG. 12) when the adapter 370 is in the second position (FIG. 14).

Referring to FIGS. 12-14 and 18-21, when the adapter 370 is in the first position (seen in FIG. 13) the mating feature 424 located at the first end portion 420 of the toggle button 400 (FIG. 18) may be received by the first engagement feature 440 located on the hub 366 of the stroller 310. The first abutment surface 462 of the engagement stop 460 of the adapter 370 may abut against the first stopper surface 448 of the inner stopper 450 of the hub 366 (the hub 366 is shown in FIG. 12). Moreover, the first angled portion 472 of the adapter 370 (shown in FIG. 21) may be configured to abut against the first stopper surface 452 of the outer stopper 450 of the hub 366 (the hub 366 is shown in FIG. 12). Similarly, when the adapter 370 is in the second position (seen in FIG. 13) the mating feature 424 located at the first end portion 420 of the toggle button 400 (FIG. 18) may be received by the second engagement feature 442 located on the hub 366 of the stroller 310. The second abutment surface 464 of the engagement stop 460 of the adapter 370 may abut against the second stopper surface 449 of the inner stopper 450 of the hub 366 (the hub 366 is shown in FIG. 12). Moreover, the second angled portion 474 of the adapter 370 (shown in FIG. 21) may be configured to abut against the second stopper surface 454 of the outer stopper 450 of the hub 366 (the hub 366 is shown in FIG. 12).

Referring generally to FIGS. 1-21, the disclosed strollers both include adapters that may be rotated between the first position (seen in FIGS. 1-2 and FIG. 13) and the second position (seen in FIGS. 3 and 14). When in the first position, the adapters may be positioned to engage with attachment mechanisms located on the infant seat. However, if the infant seat is removed from the stroller, a user may then rotate the adapters from the first position and into the second position. When in the second position, the adapters are substantially hidden from view. Some types of strollers currently available include adapters that project upwardly from the sides of the stroller. The adapters may remain in the same position even after an infant seat is removed from the stroller. Thus, these upwardly projecting adapters may be noticeable after the infant seat is removed from the stroller, especially if the adapters are large or bulky in size. Some individuals may not find the upwardly projecting adapters to be aesthetically pleasing. In contrast, the disclosed strollers include adapters that may be substantially hidden from view if the infant seat is not in use.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A stroller, comprising:
   a frame having a first side and a second side that generally oppose one another, and a first hub and a second hub located on the first side and the second side of the frame, respectively; and
   a moveable arm selectively engaging the frame and rotatable about the first hub and the second hub between a first position and a second position, the moveable arm including
      at least two adapters, each of the at least two adapters selectively engaging with an infant seat, wherein one of the at least two adapters is positioned on the first side of the stroller and a second of the at least two adapters is positioned on the second side of the stroller, wherein the at least two adapters are visible and positioned to engage the infant seat in the first position, and are substantially hidden from view in the second position; and
      a tray rotatable with the moveable arm such that the tray is positioned downwardly at an angle if the arm is in the first position, and is generally parallel to horizontal if the moveable arm is in the second position.

2. The stroller of claim 1, wherein the tray includes a cup holder.

3. The stroller of claim 1, wherein the moveable arm selectively engages with the frame of the stroller at the first hub and the second hub.

4. The stroller of claim 3, wherein the moveable arm includes a plurality of slidable arms, wherein one of the slidable arms is positioned to selectively engage the first hub and a remaining slidable arm is positioned to selectively engage the second hub.

5. The stroller of claim 3, wherein the moveable arm includes a plurality of engagement arms, wherein one of the engagement arms is positioned to selectively engage with the first hub and a remaining adapter is positioned to selectively engage with the second hub, and wherein the engagement arms secure the moveable arm in one of the first position and the second position.

6. The stroller of claim 1, wherein each of the at least two adapters includes a front side and a rear side, and wherein the rear side of each of the at least two adapters includes a mating feature selectively engages the infant seat.

7. A stroller, comprising:
   a frame having a first side, a second side, a first hub, and a second hub, wherein the first side and the second side generally oppose one another and the first hub and the second hub are located on the first side and the second side of the stroller, respectively, and the first hub and the second hub each include a first engagement feature and a second engagement feature, wherein the first engagement feature and the second engagement feature of the first hub and the second hub are indentations located within one of the first hub and the second hub; and
   at least two adapters, each selectively engaging with an infant seat, wherein one of the at least two adapters is positioned on the first side of the frame and is rotatable about the first hub between a first position and a second position, and a second of the at least two adapter is positioned on the second side of the frame and is rotatable about the second hub between the first position and the second position, and if the at least two adapters are visible, the at least two adapters engage the first indentation of one of the first hub and the second hub and are positioned to engage the infant seat in the first position, and if the at least two adapters are substantially hidden from view, the at least two adapters engage with the second indentation of one of the first hub and the second hub in the second position.

8. The stroller of claim 7, wherein the at least two adapters are independently rotatable between the first position and the second position.

9. The stroller of claim 8, wherein the at least two adapters each include a toggle button, and wherein the toggle button secures a corresponding adapter in the first position by engaging the first indentation of either the first hub or the second hub, and the second position by engaging the second indentation of either the first hub or the second hub.

10. The stroller of claim 9, wherein each of the at least two adapters includes a biasing member, and wherein the biasing member exerts a biasing force against the toggle button to secure a corresponding one of the at least two adapters in either the first position or the second position.

11. The stroller of claim 7, wherein the stroller selectively engages a carry cot if the at least two adapters are in the second position.

12. A stroller, comprising:
   a frame having a first side and a second side that generally oppose one another, and a first hub and a second hub located on the first side and the second side of the frame, respectively; and
   a moveable arm selectively engaging the frame and rotatable about the first hub and the second hub between a first position and a second position, the moveable arm including
      at least two adapters, each of the at least two adapters selectively engaging with an infant seat, wherein one of the at least two adapters is positioned on the first side of the stroller and a second of the at least two adapters is positioned on the second side of the stroller, wherein the at least two adapters are selectively visible and positioned to engage the infant; and
   a tray rotatable with the moveable arm such that the tray is positioned downwardly at an angle if the arm is in the first position, and is generally parallel to horizontal if the moveable arm is in the second position.

* * * * *